United States Patent
Sherman et al.

(10) Patent No.: US 11,055,762 B2
(45) Date of Patent: Jul. 6, 2021

(54) SYSTEMS AND METHODS FOR PROVIDING CUSTOMIZED PRODUCT RECOMMENDATIONS

(71) Applicant: The Procter & Gamble Company, Cincinnati, OH (US)

(72) Inventors: Faiz Feisal Sherman, Mason, OH (US); Shannon Christine Weitz, Liberty Township, OH (US); Jun Xu, Mason, OH (US)

(73) Assignee: The Procter & Gamble Company, Cincinnati, OH (US)

(*) Notice: Subject to any disclaimer, the term of this patent is extended or adjusted under 35 U.S.C. 154(b) by 681 days.

(21) Appl. No.: 15/465,292

(22) Filed: Mar. 21, 2017

(65) Prior Publication Data
US 2017/0270593 A1 Sep. 21, 2017

Related U.S. Application Data

(60) Provisional application No. 62/311,036, filed on Mar. 21, 2016.

(51) Int. Cl.
*G06Q 30/00* (2012.01)
*G06Q 30/06* (2012.01)
(Continued)

(52) U.S. Cl.
CPC ..... *G06Q 30/0631* (2013.01); *G06K 9/00268* (2013.01); *G06K 9/00281* (2013.01);
(Continued)

(58) Field of Classification Search
CPC .......... G06Q 30/0631; G06Q 30/0251; G06K 9/6255; G06K 9/3233; G06K 9/627;
(Continued)

(56) References Cited

U.S. PATENT DOCUMENTS

| 4,276,570 A | 6/1981 | Burson et al. |
| 5,850,463 A | 12/1998 | Horii |

(Continued)

FOREIGN PATENT DOCUMENTS

| CN | 1870047 A | 11/2006 |
| CN | 101556699 A | 10/2009 |

(Continued)

OTHER PUBLICATIONS

"Digital Image Processing: Clinical Applications and Challenges in Cosmetics," by Dimitris K. Iakovitis, IEEE Conference Paper: 2015 Conference on Cosmetic Measurements and Testing (COMET), pp. 1-4, Jun. 1, 2015 (Year: 2015).*

(Continued)

*Primary Examiner* — Anne M Georgalas
(74) *Attorney, Agent, or Firm* — John G. Powell

(57) ABSTRACT

Systems and methods for providing customized skin care product recommendations. The system utilizes an image capture device and a computing device coupled to the image capture device. The computing device causes the system to analyze a captured image of a user via the by processing the image through a convolutional neural network to determine a skin age of the user. Determining the skin age may include identifying at least one pixel that is indicative of the skin age and utilizing the at least one pixel to create a heat map that identifies a region of the image that contributes to the skin age. The system may be used to determine a target skin age of the user, determine a skin care product for achieving the target skin age, and provide an option for the user to purchase the product.

19 Claims, 13 Drawing Sheets

(51) Int. Cl.

| | | |
|---|---|---|
| *G06Q 30/02* | (2012.01) | |
| *G06K 9/62* | (2006.01) | |
| *G06K 9/32* | (2006.01) | |
| *G06K 9/00* | (2006.01) | |
| *G06K 9/46* | (2006.01) | |
| *G06N 3/08* | (2006.01) | |
| *G06N 3/04* | (2006.01) | |
| *G06N 5/04* | (2006.01) | |

(52) U.S. Cl.
CPC ......... *G06K 9/3233* (2013.01); *G06K 9/4628* (2013.01); *G06K 9/4642* (2013.01); *G06K 9/627* (2013.01); *G06K 9/6255* (2013.01); *G06K 9/6256* (2013.01); *G06N 3/0454* (2013.01); *G06N 3/08* (2013.01); *G06N 3/082* (2013.01); *G06N 5/04* (2013.01); *G06Q 30/0251* (2013.01)

(58) Field of Classification Search
CPC ............. G06K 9/00281; G06K 9/4628; G06K 9/4642; G06K 9/00268; G06K 9/6256; G06N 3/082; G06N 3/0454; G06N 3/08; G06N 5/04
See application file for complete search history.

(56) References Cited

U.S. PATENT DOCUMENTS

| | | | |
|---|---|---|---|
| 5,983,120 A | 11/1999 | Groner et al. | |
| 6,556,196 B1 | 4/2003 | Blanz et al. | |
| 6,571,003 B1* | 5/2003 | Hillebrand | A61B 5/0064 |
| | | | 382/100 |
| 6,619,860 B1 | 9/2003 | Simon | |
| 6,734,858 B2 | 5/2004 | Attar et al. | |
| 6,761,697 B2 | 7/2004 | Rubinstenn et al. | |
| 6,959,119 B2 | 10/2005 | Hawkins et al. | |
| 7,200,281 B2 | 4/2007 | Zhang et al. | |
| 7,362,886 B2* | 4/2008 | Rowe | G06K 9/00288 |
| | | | 382/118 |
| 7,437,344 B2* | 10/2008 | Peyrelevade | A45D 44/005 |
| | | | 706/62 |
| 7,634,103 B2 | 12/2009 | Rubinstenn et al. | |
| 7,912,246 B1* | 3/2011 | Moon | G06K 9/00221 |
| | | | 382/103 |
| 8,014,589 B2 | 9/2011 | del Valle | |
| 8,077,931 B1 | 12/2011 | Chatman | |
| 8,094,186 B2* | 1/2012 | Fukuoka | A61B 5/442 |
| | | | 348/77 |
| 8,254,647 B1 | 8/2012 | Nechyba | |
| 8,391,639 B2 | 3/2013 | Hillebrand et al. | |
| 8,401,300 B2 | 3/2013 | Jiang et al. | |
| 8,425,477 B2* | 4/2013 | Mou | A45D 44/002 |
| | | | 604/304 |
| 8,491,926 B2 | 7/2013 | Mohammadi | |
| 8,520,906 B1 | 8/2013 | Moon | |
| 8,550,818 B2 | 10/2013 | Fidaleo et al. | |
| 8,582,807 B2 | 11/2013 | Yang | |
| 8,625,864 B2* | 1/2014 | Goodman | G16H 50/20 |
| | | | 382/128 |
| 8,666,770 B2 | 3/2014 | Maes et al. | |
| 8,725,560 B2 | 5/2014 | Aarabi | |
| 8,861,881 B2 | 10/2014 | Tate | |
| 9,013,567 B2* | 4/2015 | Clemann | A45D 44/005 |
| | | | 348/77 |
| 9,189,679 B2 | 11/2015 | Yamazaki | |
| 9,311,564 B2* | 4/2016 | Savvides | G06K 9/4604 |
| 9,928,410 B2* | 3/2018 | Yoo | G06K 9/4628 |
| 2001/0037191 A1 | 11/2001 | Furuta et al. | |
| 2003/0065255 A1 | 4/2003 | Giacchetti et al. | |
| 2003/0065589 A1 | 4/2003 | Giacchetti et al. | |
| 2003/0198402 A1 | 10/2003 | Zhang | |
| 2004/0122299 A1 | 6/2004 | Nakata | |
| 2004/0125996 A1 | 7/2004 | Eddowes | |
| 2004/0170337 A1 | 9/2004 | Simon et al. | |
| 2004/0213454 A1 | 10/2004 | Lai et al. | |
| 2004/0223631 A1 | 11/2004 | Waupotitsch | |
| 2006/0023923 A1 | 2/2006 | Geng | |
| 2006/0257041 A1 | 11/2006 | Kameyama et al. | |
| 2006/0274071 A1 | 12/2006 | Bazin | |
| 2007/0052726 A1 | 3/2007 | Wright | |
| 2007/0053940 A1 | 3/2007 | Huang et al. | |
| 2007/0070440 A1 | 3/2007 | Li et al. | |
| 2007/0071314 A1 | 3/2007 | Bhatti | |
| 2007/0104472 A1 | 5/2007 | Quan | |
| 2007/0229498 A1 | 10/2007 | Matusik | |
| 2008/0080746 A1 | 4/2008 | Payonk | |
| 2008/0089561 A1 | 4/2008 | Zhang | |
| 2008/0194928 A1 | 8/2008 | Bandic | |
| 2008/0212894 A1* | 9/2008 | Demirli | G06T 11/00 |
| | | | 382/276 |
| 2008/0316227 A1 | 12/2008 | Fleury et al. | |
| 2009/0003709 A1 | 1/2009 | Kaneda | |
| 2009/0028380 A1 | 1/2009 | Hillebrand | |
| 2009/0245603 A1 | 10/2009 | Koruga | |
| 2010/0068247 A1 | 3/2010 | Mou | |
| 2010/0172567 A1 | 7/2010 | Prokoski | |
| 2010/0185064 A1* | 7/2010 | Bandic | A61B 5/415 |
| | | | 600/306 |
| 2010/0189342 A1 | 7/2010 | Parr et al. | |
| 2010/0329525 A1 | 12/2010 | Goodman | |
| 2011/0016001 A1 | 1/2011 | Schieffelin | |
| 2011/0064331 A1 | 3/2011 | Andres del Valle | |
| 2011/0116691 A1* | 5/2011 | Chung | A61B 5/442 |
| | | | 382/128 |
| 2011/0158540 A1 | 6/2011 | Suzuki | |
| 2011/0196616 A1* | 8/2011 | Gunn | G06T 7/0012 |
| | | | 702/19 |
| 2011/0222724 A1 | 9/2011 | Yang | |
| 2011/0249891 A1 | 10/2011 | Li | |
| 2011/0300196 A1 | 12/2011 | Mohammadi | |
| 2012/0223131 A1 | 9/2012 | Lim | |
| 2012/0253755 A1* | 10/2012 | Gobel | G16H 50/30 |
| | | | 703/2 |
| 2012/0300049 A1 | 11/2012 | Clemann | |
| 2012/0325141 A1 | 12/2012 | Mohammadi | |
| 2013/0013330 A1* | 1/2013 | Guerra | G06Q 30/06 |
| | | | 705/2 |
| 2013/0029723 A1 | 1/2013 | Das | |
| 2013/0041733 A1 | 2/2013 | Officer | |
| 2013/0079620 A1 | 3/2013 | Kuth et al. | |
| 2013/0083999 A1* | 4/2013 | Bhardwaj | G06K 9/4652 |
| | | | 382/165 |
| 2013/0089245 A1 | 4/2013 | Yamazaki | |
| 2013/0094780 A1 | 4/2013 | Tang et al. | |
| 2013/0158968 A1 | 6/2013 | Ash et al. | |
| 2013/0169621 A1 | 7/2013 | Mei | |
| 2013/0271451 A1 | 10/2013 | Tong | |
| 2013/0325493 A1 | 12/2013 | Wong et al. | |
| 2014/0089017 A1 | 3/2014 | Klappert et al. | |
| 2014/0099029 A1 | 4/2014 | Savvides | |
| 2014/0201126 A1 | 7/2014 | Zadeh | |
| 2014/0209682 A1 | 7/2014 | Gottwals et al. | |
| 2014/0211022 A1 | 7/2014 | Koh et al. | |
| 2014/0219526 A1 | 8/2014 | Linguraru et al. | |
| 2014/0226896 A1 | 8/2014 | Imai | |
| 2014/0270490 A1 | 9/2014 | Wus et al. | |
| 2014/0304629 A1 | 10/2014 | Cummins et al. | |
| 2014/0323873 A1 | 10/2014 | Cummins et al. | |
| 2014/0334723 A1 | 11/2014 | Chatow | |
| 2015/0045631 A1 | 2/2015 | Pederson | |
| 2015/0099947 A1* | 4/2015 | Qu | A61B 5/442 |
| | | | 600/306 |
| 2015/0178554 A1 | 6/2015 | Kanaujia et al. | |
| 2015/0310040 A1 | 10/2015 | Chan | |
| 2015/0339757 A1* | 11/2015 | Aarabi | G06Q 30/06 |
| | | | 705/12 |
| 2016/0062456 A1 | 3/2016 | Wang | |
| 2016/0162728 A1 | 6/2016 | Arai et al. | |
| 2016/0219217 A1 | 7/2016 | Williams | |
| 2016/0255303 A1 | 9/2016 | Tokui | |
| 2016/0292380 A1* | 10/2016 | Cho | G06F 7/483 |

(56) References Cited

U.S. PATENT DOCUMENTS

| | | |
|---|---|---|
| 2016/0314616 A1 | 10/2016 | Su |
| 2016/0330370 A1 | 11/2016 | Ghosh |
| 2017/0032178 A1 | 2/2017 | Henry |
| 2017/0039357 A1 | 2/2017 | Hwang |
| 2017/0178058 A1 | 6/2017 | Bhat |
| 2017/0178220 A1* | 6/2017 | Chong ............... G06K 9/00268 |
| 2017/0246473 A1 | 8/2017 | Marinkovich |
| 2017/0270348 A1 | 9/2017 | Morgana et al. |
| 2017/0270349 A1 | 9/2017 | Polania Cabrera et al. |
| 2017/0270350 A1 | 9/2017 | Maltz et al. |
| 2017/0270691 A1 | 9/2017 | Maltz et al. |
| 2017/0272741 A1 | 9/2017 | Maltz et al. |
| 2017/0294010 A1 | 10/2017 | Shen |
| 2017/0308738 A1 | 10/2017 | Zhang |
| 2018/0276869 A1 | 9/2018 | Matts |
| 2018/0276883 A1 | 9/2018 | D'alessandro et al. |
| 2018/0350071 A1 | 12/2018 | Purwar |
| 2018/0352150 A1 | 12/2018 | Purwar |

FOREIGN PATENT DOCUMENTS

| | | |
|---|---|---|
| CN | 104504376 A | 4/2015 |
| EP | 1297781 A1 | 4/2003 |
| EP | 1030267 B1 | 1/2010 |
| EP | 1813189 B1 | 3/2010 |
| EP | 1189536 B1 | 3/2011 |
| EP | 2728511 A1 | 5/2014 |
| GB | 2424332 A | 9/2006 |
| JP | 2007050158 A | 3/2007 |
| JP | 4238537 B2 | 3/2009 |
| JP | 4725298 B2 | 7/2011 |
| JP | 2012053813 A | 3/2012 |
| JP | 2014157428 A | 8/2014 |
| JP | 6417664 B2 | 11/2018 |
| KR | 20140078459 A | 6/2014 |
| WO | WO200076398 A1 | 12/2000 |
| WO | 2003049039 A1 | 6/2003 |
| WO | 2006005917 A1 | 1/2006 |
| WO | 2007044815 A2 | 4/2007 |
| WO | WO2007051299 A1 | 5/2007 |
| WO | WO2008003146 A2 | 1/2008 |
| WO | WO2008086311 A2 | 7/2008 |
| WO | WO2009100494 A1 | 8/2009 |
| WO | WO2011109168 A1 | 9/2011 |
| WO | 2011146321 A2 | 11/2011 |
| WO | 2013104015 A1 | 7/2013 |
| WO | 2014122253 A2 | 8/2014 |
| WO | WO2015017687 A2 | 2/2015 |
| WO | WO201588079 A1 | 6/2015 |
| WO | WO2017029488 A2 | 2/2017 |

OTHER PUBLICATIONS

Andreas Lanitis, Comparative Evaluation of Automatic Age-Progression Methodologies, EURASIP Journal on Advances in Signal Processing, vol. 2008, No. 1, Jan. 1, 2008, 10 pages.

Beauty.AI Press Release, PRWeb Online Visibility from Vocus, Nov. 19, 2015, 3 pages.

Chen et al., Face Image Quality Assessment Based on Learning to Rank, IEEE Signal Processing Letters, vol. 22, No. 1 (2015), pp. 90-94.

Crete et al., The blur effect: perception and estimation with a new no-reference perceptual blur metric, Proc. SPIE 6492, Human Vision and Electronic Imaging XII, 2007, 12 pages.

Dong et al., Automatic age estimation based on deep learning algorithm, Neurocomputing 187 (2016), pp. 4-10.

Finlayson et al., Color by Correlation: A Simple, Unifying Framework for Color Constancy, IEEE Transactions on Pattern Analysis and Machine Intelligence, vol. 23, No. 11, Nov. 2001, pp. 1209-1221.

Fu et al., Learning Race from Face: A Survey, IEEE Transactions on Pattern Analysis and Machine Intelligence, vol. 36, No. 12, Dec. 1, 2014, pp. 2483-2509.

Gong et al., Quantification of Pigmentation in Human Skin Images, IEEE, 2012, pp. 2853-2856.

Gray et al., Predicting Facial Beauty without Landmarks, European Conference on Computer Vision, Computer Vision—ECCV 2010, 14 pages.

Guodong Guo et al., A framework for joint estimation of age, gender and ethnicity on a large database, Image and Vision Computing, vol. 32, No. 10, May 10, 2014, pp. 761-770.

Huerta et al., A deep analysis on age estimation, Pattern Recognition Letters 68 (2015), pp. 239-249.

Hyvarinen et al., A Fast Fixed-Point Algorithm for Independent Component Analysis of Complex Valued Signals, Neural Networks Research Centre, Helsinki University of Technology, Jan. 2000, 15 pages.

Hyvarinen et al., A Fast Fixed-Point Algorithm for Independent Component Analysis, Neural Computation, 9:1483-1492, 1997.

International Search Report and Written Opinion of the International Searching Authority, PCT/US2017/023334, dated May 15, 2017, 12 pages.

International Search Report and Written Opinion of the International Searching Authority, PCT/US2018/023042, dated Jun. 6, 2018.

International Search Report and Written Opinion of the International Searching Authority, PCT/US2018/023219, dated Jun. 1, 2018, 13 pages.

International Search Report and Written Opinion of the International Searching Authority, PCT/US2018/035291, dated Aug. 30, 2018, 11 pages.

International Search Report and Written Opinion of the International Searching Authority, PCT/US2018/035296, dated Oct. 17, 2018, 17 pages.

Jagtap et al., Human Age Classification Using Facial Skin Aging Features and Artificial Neural Network, Cognitive Systems Research vol. 40 (2016), pages 116-128

Konig et al., A New Context: Screen to Face Distance, 8th International Symposium on Medical Information and Communication Technology (ISMICT), IEEE, Apr. 2, 2014, pp. 1-5.

Krizhevsky et al., ImageNet Classification with Deep Convolutional Neural Networks, part of Advances in Neural Information Processing Systems 25 (NIPS 2012), 9 pages.

Levi et al., Age and Gender Classification Using Convolutional Neural Networks, IEEE Conference on Computer Vision and Pattern Recognition (CVPR) Workshops, 2015, pp. 34-42.

Mathias et al., Face Detection Without Bells and Whistles, European Conference on Computer Vision, 2014, pp. 720-735.

Ojima et al., Application of Image-Based Skin Chromophore Analysis to Cosmetics, Journal of Imaging Science and Technology, vol. 48, No. 3, May 2004, pp. 222-226.

Sun et al., Statistical Characterization of Face Spectral Reflectances and Its Application to Human Portraiture Spectral Estimation, Journal of Imaging Science and Technology, vol. 46, No. 6, 2002, pp. 498-506.

Sung Eun Choi et al., Age face simulation using aging functions on global and local features with residual images, Expert Systems with Applications, vol. 80, Mar. 7, 2017, pp. 107-125.

Tsumura et al., Image-based skin color and texture analysis/synthesis by extracting hemoglobin and melanin information in the skin, ACM Transactions on Graphics (TOG), vol. 22, Issue 3, Jul. 2003, pp. 770-779.

Viola et al., Robust Real-Time Face Detection, International Journal of Computer Vision 57(2), 2004, pp. 137-154.

Wang et al., Combining Tensor Space Analysis and Active Appearance Models for Aging Effect Simulation on Face Images, IEEE Transactions on Systems, Man, and Cybernetics—Part B: Cybernetics, vol. 42, No. 4, Aug. 1, 2012, pp. 1107-1118.

Wang et al., Deeply-Learned Feature for Age Estimation, 2015 IEEE Winter Conference on Applications of Computer Vision, pp. 534-541.

Wu et al., Funnel-Structured Cascade for Multi-View Face Detection with Alignment-Awareness, Neurocomputing 221 (2017), pp. 138-145.

Xiangbo Shu et al., Age progression: Current technologies and applications, Neurocomputing, vol. 208, Oct. 1, 2016, pp. 249-261.

(56) References Cited

OTHER PUBLICATIONS

Yi et al., Age Estimation by Multi-scale Convolutional Network, Computer Vision—ACCV 2014, Nov. 1, 2014, pp. 144-158, 2015.
Yun Fu et al., Age Synthesis and Estimation via Faces: A Survey, IEEE Transactions on Pattern Analysis and Machine Intelligence, vol. 32, No. 11, Nov. 1, 2010, pp. 1955-1976.
U.S. Appl. No. 62/547,196, filed Aug. 18, 2017, Ankur Purwar.
Y. Fu, G. Guo, and T. S. Huang, "Age synthesis and estimation via faces: A survey," Pattern Analysis and Machine Intelligence, IEEE Transactions on, vol. 32, No. 11, pp. 1955-1976, 2010.
B. Tiddeman, M. Burt, and D. Permit "Prototyping and transforming facial textures for perception research," Computer Graphics and Applications, IEEE, vol. 21, No. 5, pp. 42-50, 2001.
D. M. Burt and D. I. Perrett, "Perception of age in adult Caucasian male faces: Computer graphic manipulation of shape and colour information," Proceedings of the Royal Society of London. Series B: Biological Sciences, vol. 259, No. 1355, pp. 137-143, 1995.
A. Lanitis, C. J. Taylor, and T. F. Cootes, "Toward automatic simulation of aging effects on face images," IEEE Transactions on Pattern Analysis and Machine Intelligence, vol. 24, No. 4, pp. 442-455, Apr. 2002.
Z. Liu, Z. Zhang, and Y. Shan, "Image-based surface detail transfer," Computer Graphics and Applications, IEEE, vol. 24, No. 3, pp. 30-35, 2004.
E. Patterson, K. Ricanek, M. Albert, and E. Boone, "Automatic representation of adult aging in facial images," in Proc. IASTED Int'l Conf. Visualization, Imaging, and Image Processing, 2006, pp. 171-176.
T. J. Hutton, B. F. Buxton, P. Hammond, and H. W. Potts, "Estimating average growth trajectories in shape-space using kernel smoothing," Medical Imaging, IEEE Transactions on, vol. 22, No. 6, pp. 747-753, 2003.
D. Dean, M. G. Hans, F. L. Bookstein, and K. Subramanyan, "Three-dimensional Bolton—Brush Growth Study landmark data: ontogeny and sexual dimorphism of the Bolton standards cohort," 2009.
J. H. Langlois and L. A. Roggman, "Attractive faces are only average," Psychological science, vol. 1, No. 2, pp. 115-121, 1990.
Y. H. Kwon and N. da Vitoria Lobo, "Age classification from facial images," in Computer Vision and Pattern Recognition, 1994. Proceedings CVPR'94., 1994 IEEE Computer Society Conference on, 1994, pp. 762-767.
P. A. George and G. J. Hole, "Factors influencing the accuracy of age estimates of unfamiliar faces," Perception-London-, vol. 24, pp. 1059-1059, 1995.
I. Pitanguy, F. Leta, D. Pamplona, and H. I. Weber, "Defining and measuring aging parameters," Applied Mathematics and Computation, vol. 78, No. 2-3, pp. 217-227, Sep. 1996.
Y. Wu, P. Kalra, and N. M. Thalmann, "Simulation of static and dynamic wrinkles of skin," in Computer Animation'96. Proceedings, 1996, pp. 90-97.
P. N. Belhumeur, J. P. Hespanha, and D. Kriegman, "Eigenfaces vs. fisherfaces: Recognition using class specific linear projection," Pattern Analysis and Machine Intelligence, IEEE Transactions on, vol. 19, No. 7, pp. 711-720, 1997.
M. J. Jones and T. Poggio, "Multidimensional morphable models," in Computer Vision, 1998. Sixth International Conference on, 1998, pp. 683-688.
V. Blanz and T. Vetter, "A morphable model for the synthesis of 3D faces," in Proceedings of the 26th annual conference on Computer graphics and interactive techniques, 1999, pp. 187-194.
L. Boissieux, G. Kiss, N. M. Thalmann, and P. Kalra, Simulation of skin aging and wrinkles with cosmetics insight. Springer, 2000.
T. F. Cootes, G. J. Edwards, and C. J. Taylor, "Active appearance models," IEEE Transactions on pattern analysis and machine intelligence, vol. 23, No. 6, pp. 681-685, 2001.
Y. Bando, T. Kuratate, and T. Nishita, "A simple method for modeling wrinkles on human skin," in Computer Graphics and Applications, 2002. Proceedings. 10th Pacific Conference on, 2002, pp. 166-175.
M. R. Gandhi, "A method for automatic synthesis of aged human facial images," McGill University, 2004.
A. Lanitis, C. Draganova, and C. Christodoulou, "Comparing different classifiers for automatic age estimation," Systems, Man, and Cybernetics, Part B: Cybernetics, IEEE Transactions on, vol. 34, No. 1, pp. 621-628, 2004.
S. R. Coleman and R. Grover, "The anatomy of the aging face: volume loss and changes in 3-dimensional topography," Aesthetic surgery journal, vol. 26, No. 1 suppl, pp. S4-S9, 2006.
Y. Fu and N. Zheng, "M-face: An appearance-based photorealistic model for multiple facial attributes rendering," Circuits and Systems for Video Technology, IEEE Transactions on, vol. 16, No. 7, pp. 830-842, 2006.
X. Geng, Z.-H. Zhou, Y. Zhang, G. Li, and H. Dai, "Learning from facial aging patterns for automatic age estimation," in Proceedings of the 14th annual ACM international conference on Multimedia, 2006, pp. 307-316.
N. Ramanathan and R. Chellappa, "Modeling age progression in young faces," in Computer Vision and Pattern Recognition, 2006 IEEE Computer Society Conference on, 2006, vol. 1, pp. 387-394.
C. J. Solomon, S. J. Gibson, and others, "A person-specific, rigorous aging model of the human face," Pattern Recognition Letters, vol. 27, No. 15, pp. 1776-1787, 2006.
K. Ueki, T. Hayashida, and T. Kobayashi, "Subspace-based age-group classification using facial images under various lighting conditions," in Automatic Face and Gesture Recognition, 2006. FGR 2006. 7th International Conference on, 2006, p. 6-pp.
A. M. Albert, K. Ricanek Jr, and E. Patterson, "A review of the literature on the aging adult skull and face: Implications for forensic science research and applications," Forensic Science International, vol. 172, No. 1, pp. 1-9, 2007.
X. Geng, Z.-H. Zhou, and K. Smith-Miles, "Automatic age estimation based on facial aging patterns," Pattern Analysis and Machine Intelligence, IEEE Transactions on, vol. 29, No. 12, pp. 2234-2240, 2007.
K. Scherbaum, M. Sunkel, H.-P. Seidel, and V. Blanz, "Prediction of Individual Non-Linear Aging Trajectories of Faces," in Computer Graphics Forum, 2007, vol. 26, pp. 285-294.
J. Suo, F. Min, S. Zhu, S. Shan, and X. Chen, "A multi-resolution dynamic model for face aging simulation," in Computer Vision and Pattern Recognition, 2007. CVPR'07. IEEE Conference on, 2007, pp. 1-8.
Y. Fu and T. S. Huang, "Human age estimation with regression on discriminative aging manifold," Multimedia, IEEE Transactions on, vol. 10, No. 4, pp. 578-584, 2008.
G. Guo, Y. Fu, C. R. Dyer, and T. S. Huang, "Image-based human age estimation by manifold learning and locally adjusted robust regression," Image Processing, IEEE Transactions on, vol. 17, No. 7, pp. 1178-1188, 2008.
F. Jiang and Y. Wang, "Facial aging simulation based on super-resolution in tensor space," in Image Processing, 2008. ICIP 2008. 15th IEEE International Conference on, 2008, pp. 1648-1651.
U. Park, Y. Tong, and A. K. Jain, "Face recognition with temporal invariance: A 3d aging model," in Automatic Face & Gesture Recognition, 2008. FG'08. 8th IEEE International Conference on, 2008, pp. 1-7.
N. Ramanathan and R. Chellappa, "Modeling shape and textural variations in aging faces," in Automatic Face & Gesture Recognition, 2008. FG'08. 8th IEEE International Conference on, 2008, pp. 1-8.
B. Guyuron, D. J. Rowe, A. B. Weinfeld, Y. Eshraghi, A. Fathi, and S. Iamphongsai, "Factors contributing to the facial aging of identical twins," Plastic and reconstructive surgery, vol. 123, No. 4, pp. 1321-1331, 2009.
G. Mu, G. Guo, Y. Fu, and T. S. Huang, "Human age estimation using bio-inspired features," in Computer Vision and Pattern Recognition, 2009. CVPR 2009. IEEE Conference on, 2009, pp. 112-119.
N. Ramanathan, R. Chellappa, and S. Biswas, "Computational methods for modeling facial aging: A survey," Journal of Visual Languages & Computing, vol. 20, No. 3, pp. 131-144, 2009.

(56) References Cited

OTHER PUBLICATIONS

U. Park, Y. Tong, and A. K. Jain, "Age-invariant face recognition," Pattern Analysis and Machine Intelligence, IEEE Transactions on, vol. 32, No. 5, pp. 947-954, 2010.
J. Suo, S.-C. Zhu, S. Shan, and X. Chen, "A compositional and dynamic model for face aging," Pattern Analysis and Machine Intelligence, IEEE Transactions on, vol. 32, No. 3, pp. 385-401, 2010.
K. Sveikata, I. Balciuniene, and J. Tutkuviene, "Factors influencing face aging. Literature review," Stomatologija, vol. 13, No. 4, pp. 113-115, 2011.
J. P. Farkas, J. E. Pessa, B. Hubbard, and R. J. Rohrich, "The science and theory behind facial aging," Plastic and Reconstructive Surgery—Global Open, vol. 1, No. 1, pp. e8-e15, 2013.
J. Gatherwright, M. T. Liu, B. Amirlak, C. Gliniak, A. Totonchi, and B. Guyuron, "The Contribution of Endogenous and Exogenous Factors to Male Alopecia: A Study of Identical Twins," Plastic and reconstructive surgery, vol. 131, No. 5, p. 194e-801e, 2013.
F. Durand and B. Freeman, "14: Image Warping and Morphing," presented at the 6.882 Advanced Computational Photography, MIT.
Pitanguy et al., Numerical Modeling of Facial Aging, Plastic and Reconstructive Surgery, vol. 102, No. 1, pp. 200-204, 1998.

\* cited by examiner

FIG. 3A
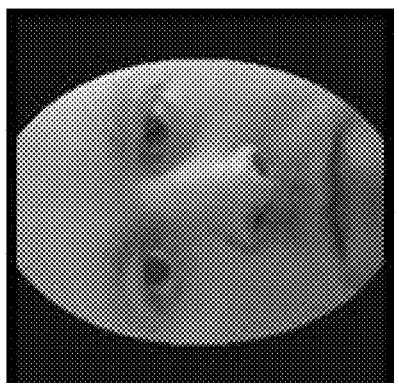
FIG. 3B
FIG. 3C
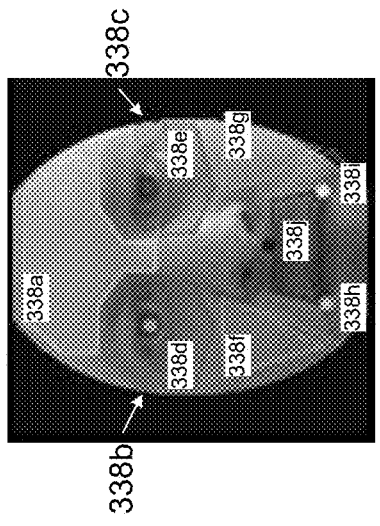
FIG. 3D
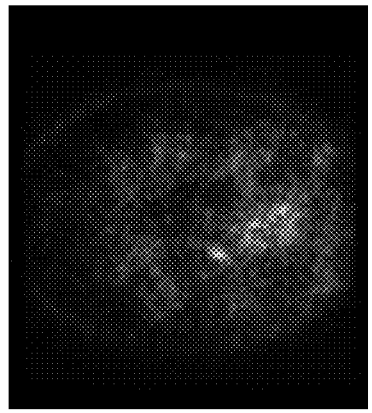
FIG. 3E
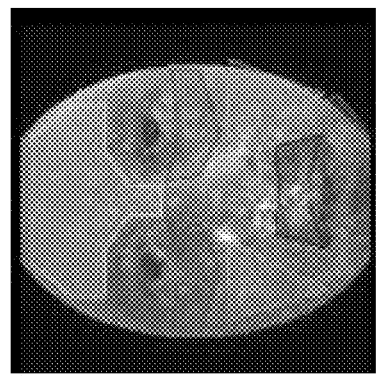
FIG. 3F

SYSTEMS AND METHODS FOR PROVIDING CUSTOMIZED PRODUCT RECOMMENDATIONS

FIELD

The present application relates generally to systems and methods for providing customized product recommendations and specifically to embodiments related to utilizing a convolutional neural network to identify features of an image and utilize the features to recommend products.

BACKGROUND

A wide variety skin care products are marketed for treating skin conditions, but it is not uncommon for a consumer to have difficulty determining which skin care product she should use. As a result, consumers may purchase a skin care product that does not treat the particular skin condition for which the consumer is seeking treatment. Accordingly, there remains a need for skin care products that are customized for a consumer's needs.

U.S. Publication No. 2013/0013330 ("the '330 Publication") relates to a method for assessment of aesthetic and morphological conditions of the skin and prescription of cosmetic and/or dermatological treatment. The '330 Publication describes obtaining information on the age and life habits of a user; performing a biometric analysis of a corporeal portion of the user; processing the results from the analyses and comparing them with predetermined data on aesthetic and morphological factors of the skin; obtaining a skin model of the user according to the data processed; linking the user's skin model to at least two-dimensional predetermined data contained in a database about cosmetic and/or dermatological products; and prescribing a kit of pre-selected cosmetic and/or dermatological products. While the '330 Publication describes performing an analysis of a user's skin and performing treatment based on the analysis, the '330 Publication fails to utilize a convolutional neural network. The '330 Publication also fails to describe evaluating skin features and performing a comparison with a baseline.

U.S. Pat. No. 8,625,864 ("the '864 Patent") relates to a system and method of cosmetic analysis and treatment diagnosis. The '864 Patent describes receiving assessment data of observable characteristics of each of a plurality of defined body areas of a subject; converting the assessment data for each of the plurality of defined body areas to weighted data associated with each body area; generating cosmetic analysis data from the weighted data; and outputting the cosmetic analysis data. Thus, while the '864 Patent describes systems that may perform a cosmetic analysis, the '864 Patent and other prior art fails to disclose evaluating skin preferences or determining product preferences.

Accordingly, there is a need for an improved method of evaluating consumer skin conditions and providing a customized product recommendation based on said evaluation.

SUMMARY

Included are embodiments for providing customized product recommendations. Some embodiments include a system that includes an image capture device and a computing device that is coupled to the image capture device. The computing device may include a memory component that stores logic that causes the system to capture an image of a user via the image capture device and process the image through a convolutional neural network to determine a skin age of the user. Determining the skin age may include identifying at least one pixel that is indicative of the skin age and utilizing the at least one pixel to create a heat map that identifies a region of the image that contributes to the skin age. The logic may further cause the system to determine a target skin age of the user, determine a product for the user to apply to a region of skin of the user for achieving the target skin age, and provide an option for the user to purchase the product.

Also included are embodiments of a method. Some embodiments of the method include receiving an image of a user and processing the image through a convolutional neural network to determine a skin age of the user. Determining the skin age may include identifying at least one pixel that is indicative of the skin age and utilizing the pixel to create a two-dimensional heat map that identifies a region of the image that contributes to the skin age. The method may also include determining a product for the user to apply to a region of skin for achieving a target skin age, where the product is determined as being applicable to the region and providing an option for the user to purchase the product.

Also included are embodiments of a non-transitory computer-readable medium. Some embodiments of the non-transitory computer-readable medium include logic that causes a computing device to receive an image of a user and create a two-dimensional heat map of the image, where the two-dimensional heat map is created via a convolutional neural network to identify at least one pixel of the image that is indicative of a skin age, and where the two-dimensional heat map identifies a region of the image that contributes to the skin age. The logic may further cause the computing device to determine, from the two-dimensional heat map, a target skin age of the user and determine a product for the user to apply to a region of skin for achieving the target skin age. In some embodiments, the logic causes the computing device to provide an option for the user to purchase the product.

BRIEF DESCRIPTION OF THE DRAWINGS

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate various embodiments described herein, and together with the description serve to explain the principles and operations of the claimed subject matter.

FIGS. 3A-3F depict an image that may be analyzed to determine a feature for treatment, according to embodiments described herein;

DETAILED DESCRIPTION

Figure 1:
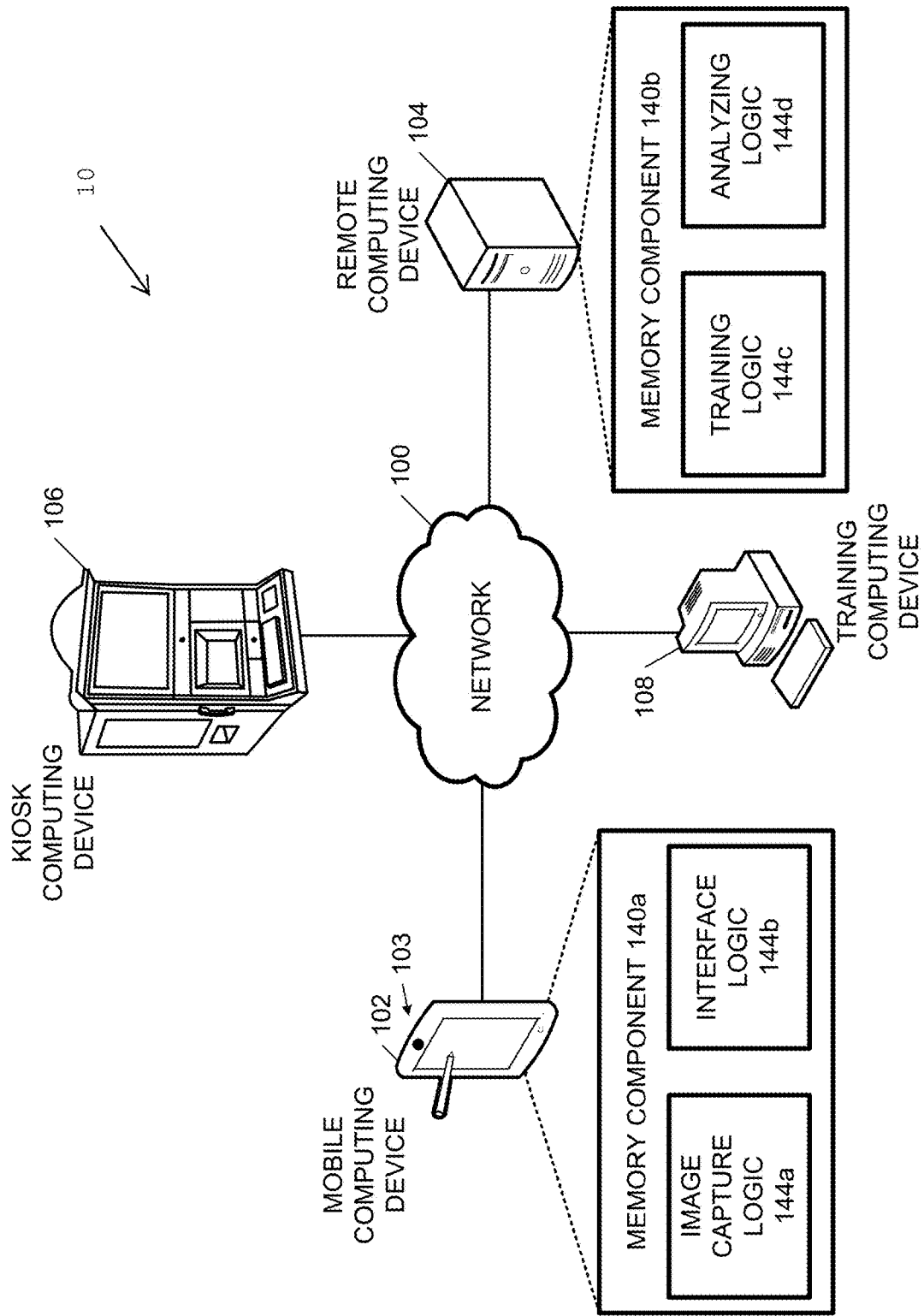
FIG. 1 depicts a computing environment for providing customized product recommendations, according to embodiments described herein.

A variety of systems and methods have been used in the cosmetics industry to provide customized product recommendations to consumers. For example, systems that use a feature-based analysis, in which one or more features of a skin condition (e.g., fine lines, wrinkles, spots, uneven skin tone) are detected in a captured image (e.g., digital photo) by looking for features that meet a predefined definition, are commonly used for analyzing skin. However, feature based analysis systems rely on predetermined definitions for the particular skin conditions of interest and can require substantial computer memory and/or processing power. As a result, feature-based systems may not provide the desired level of accuracy when diagnosing a skin condition or determining skin age.

In view of the drawbacks of some conventional feature-based image analysis systems, the methods and systems described herein rely on a convolutional neural network ("CNN") based system to provide a user with an analysis of skin age and indications of skin conditions. The CNN based image analysis system herein uses relatively little image pre-processing, which reduces the dependence of the system on prior knowledge and predetermined definitions. Consequently, the present system demonstrates improved generalization compared to a conventional feature-based image analysis system and can provide a more accurate skin analysis and/or age prediction, which may lead to a better skin care product or regimen recommendations for a consumer who uses the system.

Definitions

"Anchor feature" means a feature on the face of a user that is utilized for normalizing an image of the user's face.

"Convolutional neural network" is a type of feed-forward artificial neural network where the individual neurons are tiled in such a way that they respond to overlapping regions in the visual field.

"Data augmentation" means altering data associated with a training image or other image to create additional samples for the image.

"Heat map" herein refers to a digital image of a user's face in which portions of the image are visually highlighted to identify skin features and/or areas (e.g., forehead, cheek, nasolabial folds, crow's feet, under eye, upper lip) that contributes to a determined skin age.

"Image capture device" means a device such as a digital camera capable of capturing an image of a user;

"Skin age" means the age of a user's skin calculated by the system herein, based on a captured image.

"Target skin age" means a skin age that is a predetermined number of years less than the skin age.

"User" herein refers to any person who uses at least the features provided herein, including, for example, a device user, a product user, a system user, and the like.

The systems and methods herein use a trained convolutional neural network, which functions as an in silico skin model, to predict the skin age of a user by analyzing a captured image of the skin of the user (e.g., facial skin). The CNN comprises multiple layers of neuron collections that use the same filters for each pixel in a layer. Using the same filters for each pixel in the various combinations of partially and fully connected layers reduces memory and processing requirements of the system.

In some instances, the system may include a preprocessing stage followed by a stage for CNN training and image analysis. During preprocessing, one or more facial features common to most users, such as eyes, forehead, cheeks, nose, under eye region, outer eye region, nasolabial folds, lips, and portions of the face adjacent these features ("anchor features"), in a received image may be detected. The system may detect the anchor feature(s) using known edge detection techniques, shape detection techniques, and the like. Based on the location of the anchor feature(s), the image may be scaled and rotated to make the image substantially level and with the anchor feature(s) arranged in a predetermined position in the final image. In this way, training images can be consistently aligned, thus providing more consistent training and analysis. The image may then be cropped to a predetermined area of pixels as input for further processing.

Preprocessing may also include image normalization. For example, global contrast normalization may be utilized to standardize the training images (and/or images of users). Similarly, the images may be masked with a fixed (or predetermined) size oval mask to minimize the influence of other features like hair, neck and other undesired objects in the image.

In some instances, data augmentation may be performed to create additional samples from an inputted image. The additional samples are used to train the CNN to tolerate variation in input images. This helps improve the accuracy of the model. In other words, the CNN is able to extract the information necessary for a suitable analysis in spite of differences in, for example, the way people take photographs, the conditions in which photos are taken, and the hardware used to take a photo. The additional samples generated by data augmentation can also force the CNN to learn to rely on a variety of features for skin age prediction, rather than one particular feature, and may prevent overtraining of the CNN. Some non-limiting examples of data augmentation include randomly enlarging or shrinking the image, randomly rotating the image in a clockwise or counter-clockwise direction, randomly cropping the image, and/or randomly changing the saturation and/or exposure of the image. In some instances the image data may be augmented by subjecting the input image to random vertical dropout, in which a random column of pixels is removed from the image.

The CNN herein may be trained using a deep learning technique, which allows the CNN to learn what portions of an image contribute to skin age, much in the same way as a mammalian visual cortex learns to recognize important features in an image. In some instances, the CNN training may involve using mini-batch stochastic gradient descent (SGD) with Nesterov momentum (and/or other algorithms). An example of utilizing a stochastic gradient descent is disclosed in U.S. Pat. No. 8,582,807.

In some instances, the CNN may be trained by providing an untrained CNN with a multitude of captured images to learn from. In some instances, the CNN can learn to identify portions of skin in an image that contribute to skin age through a process called supervised learning. "Supervised learning" generally means that the CNN is trained by analyzing images in which the age of the person in the image is predetermined. Depending on the accuracy desired, the number of training images may vary from a few images to a multitude of images (e.g., hundreds or even thousands) to a continuous input of images (i.e., to provide continuous training).

The systems and methods herein utilize a trained CNN that is capable of accurately predicting the apparent age of a user for a wide range of skin types. To generate a predicted age, an image of a user (e.g., digital image of a user's face) is forward-propagating through the trained CNN. The CNN analyzes the image and identifies portions of skin in the image that contribute to the predicted age of the user ("trouble spots"). The CNN then uses the trouble spots to predict the age of the user. The system then determines a target skin age (e.g., the predicted age of the user minus a predetermined number of years (e.g., 10, 9, 8, 7, 6, 5, 4, 3, 2, or 1 year(s) or the actual age of the user), and a gradient is propagated back to the original image. The absolute value of a plurality of channels of the gradient may then be summed for at least one pixel and scaled from 0-1 for visualization purposes. The value of the scaled pixels may represent pixels that contribute most (and least) to the determination of the skin age of the user. Each scaling value (or range of values) may be assigned a color or shade, such that a virtual mask can be generated to graphically represent the scaled values of the pixels. These pixels are then arranged to form part of a two-dimensional heat map that indicates the areas on the user's face that drive the skin age (perceived age) of the consumer. In some instances, the CNN analysis and/or target age, optionally in conjunction with habits and practices input provided by a user, can be used to help provide a skin care product and/or regimen recommendation.

FIG. 1 depicts a system 10 for capturing an image of a user, analyzing the image, and providing a customized product recommendation. The system 10 may include a network 100, which may be embodied as a wide area network (such as a mobile telephone network, a public switched telephone network, a satellite network, the internet, etc.), a local area network (such as wireless-fidelity, Wi-Max, ZigBee™, Bluetooth™, etc.), and/or other forms of networking capabilities. Coupled to the network 100 are a mobile computing device 102, a remote computing device 104, a kiosk computing device 106, and a training computing device 108.

The mobile computing device 102 may be a mobile telephone, a tablet, a laptop, a personal digital assistant and/or other computing device configured for capturing, storing, and/or transferring an image such as a digital photograph. Accordingly, the mobile computing device 102 may include an image capture device 103 such as a digital camera and/or may be configured to receive images from other devices. The mobile computing device 102 may include a memory component 140a, which stores image capture logic 144a and interface logic 144b. The memory component 140a may include random access memory (such as SRAM, DRAM, etc.), read only memory (ROM), registers, and/or other forms of computing storage hardware. The image capture logic 144a and the interface logic 144b may include software components, hardware circuitry, firmware, and/or other computing infrastructure, as described herein. As described in more detail below, the image capture logic 144a may facilitate capturing, storing, preprocessing, analyzing, transferring, and/or performing other functions on a digital image of a user. The interface logic 144b may be configured for providing one or more user interfaces to the user, which may include questions, options, and the like. The mobile computing device 102 may also be configured for communicating with other computing devices via the network 100.

The remote computing device 104 may also be coupled to the network 100 and may be configured as a server (or plurality of servers), personal computer, mobile computer, and/or other computing device configured for creating and training a convolutional neural network capable of determining the skin age of a user by identifying portions of skin in a captured image that contribute to skin age. Commonly perceived skin flaws such as fine lines, wrinkles, dark (age) spots, uneven skin tone, blotchiness, enlarged pores, redness, yellowness, combinations of these and the like may all be identified by the trained CNN as contributing to the skin age of the user. The remote computing device 104 may include a memory component 140b, which stores training logic 144c and analyzing logic 144d. The training logic 144c may facilitate creation and/or training of the CNN, and thus may facilitate creation of and/or operation of the CNN. For example, the CNN may be stored as logic 144c, 144d in the memory component 140b of a remote computing device 104. The analyzing logic 144d may cause the remote computing device 104 to receive data from the mobile computing device 102 (or other computing device) and process the received data for providing a skin age, product recommendation, etc. The system 10 may also include a kiosk computing device 106, as illustrated in FIG. 1.

The kiosk computing device 106 may operate similar to the mobile computing device 102, but may also be able to dispense one or more products and/or receive payment in the form of cash or electronic transactions. In some instances, the kiosk computing device 106 may also be configured to facilitate training of the CNN, as described in more detail below with regard to the training computing device 108.

A training computing device 108 may be coupled to the network 100 to facilitate training of the CNN. For example, a trainer may provide one or more digital images of a face or skin to the CNN via the training computing device 108. The trainer may also provide information and other instructions to inform the CNN which assessments are correct and which assessments are not correct. Based on the input from the trainer, the CNN may automatically adapt, as described in more detail below.

It should be understood that while the kiosk computing device 106 is depicted as a vending machine type of device, this is merely an example. Some embodiments may utilize a mobile device that also provides payment and/or production dispensing. Similarly, the kiosk computing device 106, the mobile computing device 102, and/or the training computing device 108 may be utilized for training the CNN. As a consequence, the hardware and software depicted for the mobile computing device 102 and the remote computing device 104 may be included in the kiosk computing device 106, the training computing device 108, and/or other devices. Similarly, the hardware and software depicted for the remote computing device 1904 in FIG. 19 may be included in one or more of the mobile computing device 102, the remote computing device 104, the kiosk computing device 106, and the training computing device 108.

It should also be understood that while the remote computing device 104 is depicted in FIG. 1 as performing the convolutional neural network processing, this is merely an example.

The convolutional neural network processing may be performed by any suitable computing device, as desired.

Figure 2:
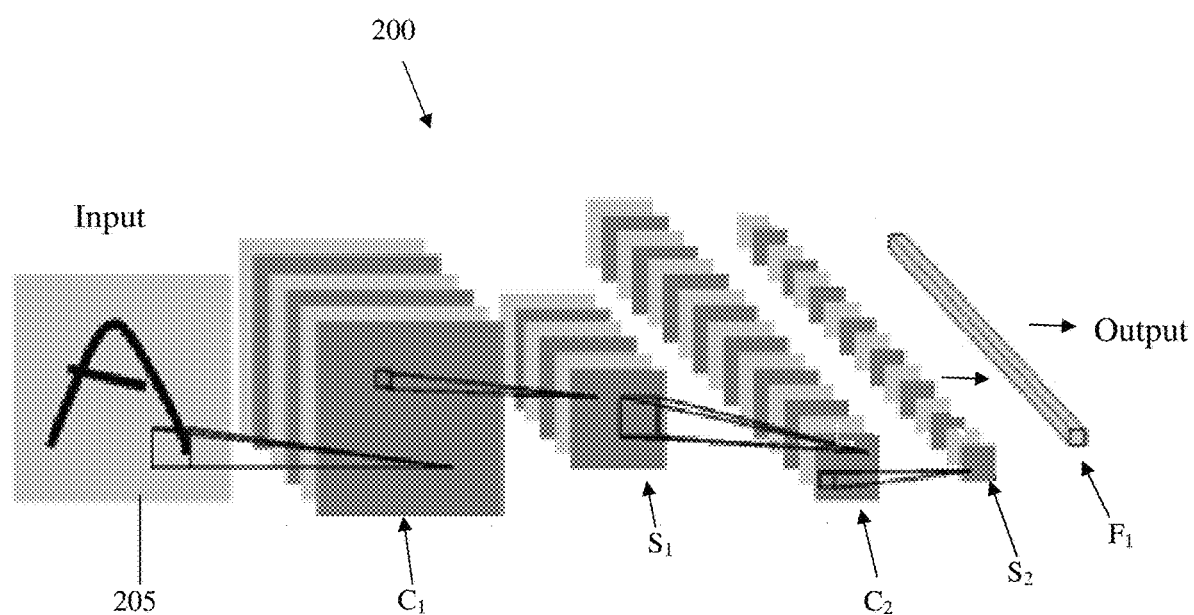
FIG. 2 depicts a structure of a convolutional neural network that may be utilized for identifying a feature of an image, according to embodiments described herein.

FIG. 2 depicts an example of a convolutional neural network 200 for use in the present system. The CNN 200 may include an inputted image 205, one or more convolution layers $C_1$, $C_2$, one or more subsampling layers $S_1$ and $S_2$, one or more partially connected layers, one or more fully connected layers, and an output. To begin an analysis or to train the CNN, an image 205 is inputted into the CNN 200 (e.g., the image of a user). The CNN may sample one or more portions of the image to create one or more feature maps in a first convolution layer $C_1$. For example, as illustrated in FIG. 2, the CNN may sample six portions of the image 205 to create six features maps in the first convolution layer $C_1$. Next, the CNN may subsample one or more portions of the feature map(s) in the first convolution layer $C_1$ to create a first subsampling layer $S_1$. In some instances, the subsampled portion of the feature map may be half the area of the feature map. For example, if a feature map comprises a sample area of 28×28 pixels from the image 205, the subsampled area may be 14×14 pixels. The CNN 200 may perform one or more additional levels of sampling and subsampling to provide a second convolution layer $C_2$ and a second subsampling layer $S_2$. It is to be appreciated that the CNN 200 may include any number of convolution layers and subsampling layers as desired. Upon completion of final subsampling layer (e.g., layer $S_2$ in FIG. 2), the CNN 200 generates a fully connected layer $F_1$, in which every neuron is connected to every other neuron. From the fully connected layer $F_1$, the CNN can generate an output such as a predicted age or a heat map.

FIGS. 3A-3F depict a system and method for analyzing a captured image 330. The captured image 330 may be captured by a user, for example, using the image capture device 103 illustrated in FIG. 1. FIG. 3B illustrates a first action taken in preprocessing, the identification of anchor features 332a-332e. The anchor features 332a-332e illustrated in FIG. 3B include eyes 332a and 332c, nose or nostril(s) 332d, and corners of the mouth 332b and 332e. But it is to be appreciated that any prominent or detectable facial feature(s) may be an anchor feature. While the anchor features 332a-332e are visually depicted in FIG. 3B, this is merely an example. Some embodiments do not provide a visual representation of anchor features 332a-332e on the mobile computing device 102.

Once the anchor features 332a-332e are identified, the captured image 330 may be normalized such that the anchor features 332a-332e are arranged in a predetermined position. In some instances, normalization may include rotating the image, resizing the image, and/or performing other image adjustments. In FIG. 3C, the captured image 330 may be further preprocessed by cropping to remove one or more unwanted portions of the captured image 330, thereby creating a normalized image 334. As an example, background, hair, ears, and/or other portions of the captured image 330 may be removed.

Once the image 330 has been preprocessed, an analysis of the normalized image 334 may be performed. As described above, the CNN 240 may be configured to determine locations, colors, and/or shade (i.e., lightness or darkness) of pixels that contribute to a skin age of the user. Depending on the particular CNN, each skin age may have different characteristics. Accordingly, the mobile computing device 102, the remote computing device 104, and/or the kiosk computing device 106 may segment the image into a plurality of regions that are typically utilized in determining skin age. FIG. 3D illustrates a first layer of a heat map, which may be described as a mask of interest 336. The mask of interest 336 identifies a plurality of regions 338a-338i that have been identified by the CNN 240 as contributing to the age of the user. For example, the mask may include a forehead region (338a), one or more under eye regions 338d and 338e, one or more outer eye regions 338b and 338c, one or more cheek regions 338f and 338g, an upper lip region 338j, and one or more nasolabial fold regions 338h and 338i. The determination of the mask of interest 336 and/or the plurality of regions 338a-338i may be customized based on the shape and/or size of the user's face, such that the regions more accurately reflect the areas that affect age determination for each user.

FIG. 3E depicts a second layer of a heat map, which may also be described as a pixel map 340. The pixel map 340 includes a multitude of scaled pixels in portions of the image identified by the system as contributing to the age of the user. As described above, a pixel-by-pixel examination of the input image may be made regarding identifiers of age to identify at least one pixel that contributes to the skin age determination. The location, shade, and/or color of each pixel may be determined and mapped, as illustrated in FIG. 3E, where the lighter pixels are identified as being a higher indicator of skin age than the darker pixels. In FIG. 3F, the pixel map 340 and the mask of interest 336 may overlay the normalized image 334 to create a two-dimensional heat map 342. The two-dimensional heat map 342 may indicate regions of skin that the CNN 240 identifies as contributing to an elevated age.

Once the CNN identifies the areas that are contributing to the predicted age of the user and generates a predicted age of the user, a two-dimensional heat map 342 can be created and the regions of interest displayed to the user for example on a mobile computing device. In some instances, a predetermined time period may be subtracted from the predicted skin age to provide a target skin age. The predicted age and/or target age may be displayed to the user, for example, on a mobile computing device. The target skin age and the regions of interest may then be utilized by the system to determine a beauty regimen and/or product for the user to utilize to realize the target skin age. In some embodiments, recommendations may be made to maintain a skin age. As an example, a user's actual age may be young enough that maintenance might be the goal. Similarly, if a user's age is determined by the CNN to be equal to or less than the user's actual age, maintenance products and/or regimens may be recommended. Additional images may be taken during or after use of a recommended product and/or regimen to monitor progress and/or revise the regimen or product recommendation.

In some instances, at least some of the images and other data described herein may be stored as historical data for later use. As an example, tracking of user progress may be determined based on this historical data. Other analyses may also be performed on this historical data, depending on the embodiment.

Figure 4:
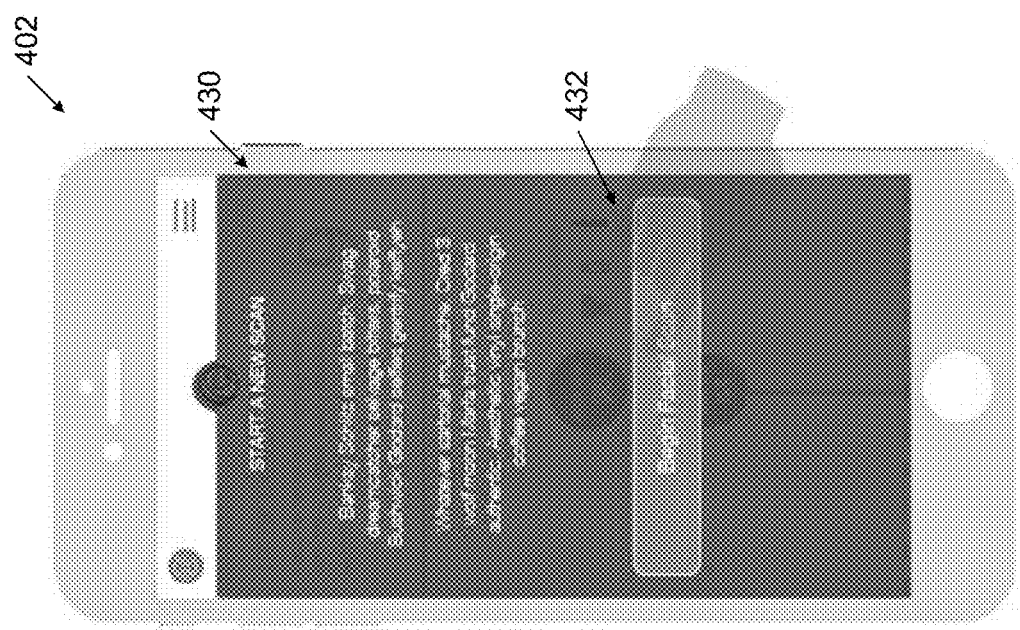
FIG. 4 depicts a user interface for capturing an image of a user for providing customized product recommendations, according to embodiments described herein.

FIG. 4 depicts a user interface 430 for capturing an image of a user and for providing customized product recommendations. As illustrated, the mobile computing device 402 may provide an application for capturing an image of a user. Accordingly, FIG. 4 depicts an introductory page on the mobile computing device 402 for beginning the process of capturing an image and providing customized product recommendations. The user interface 430 also includes a start option 432 for beginning the process.

Figure 5:
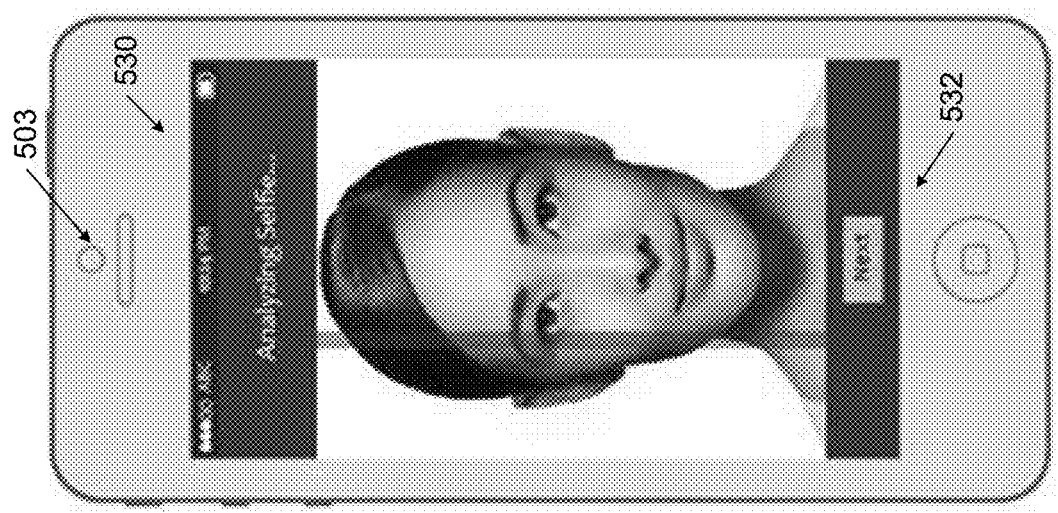
FIG. 5 depicts a user interface illustrating an image that is analyzed for providing customized product recommendations, according to embodiments described herein.

FIG. 5 depicts a user interface 530 illustrating an image that is analyzed for providing customized product recommendations, according to embodiments described herein. In response to selection of the start option 432 from FIG. 4, the user interface 530 may be provided. As illustrated, the image capture device 503 may be utilized for capturing an image of the user. In some embodiments, the user may utilize a previously captured image. Regardless, upon capturing the image, the image may be provided in the user interface 530. If the user does not wish the image be utilized, the user may retake the image. If the user approves the image, the user may select the next option 532 to begin analyzing the image and proceeding to the next user interface.

Figure 6:
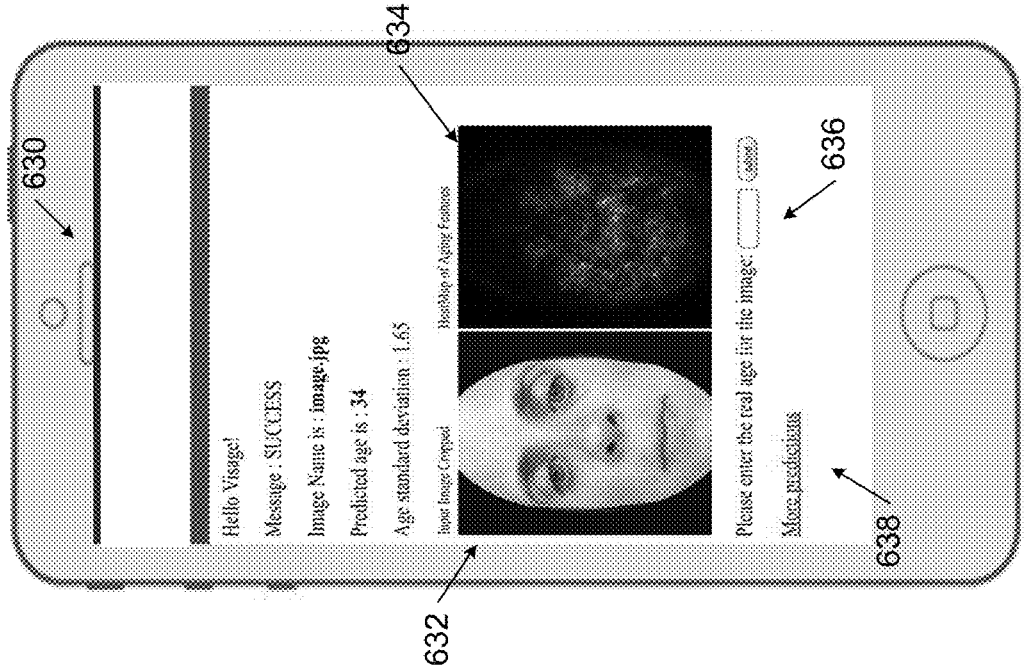
FIG. 6 depicts a user interface providing a normalized image and heat map that may be created for product recommendations, according to embodiments described herein.

FIG. 6 depicts a user interface 630 providing a normalized image 632 and a pixel map 634 that may be created for product recommendations. In response to selection of the next option 532 from FIG. 5, the user interface 30 may be provided, which may present the user with an age-input option 636. An additional-predictions option 638 may also be provided.

Figure 7:
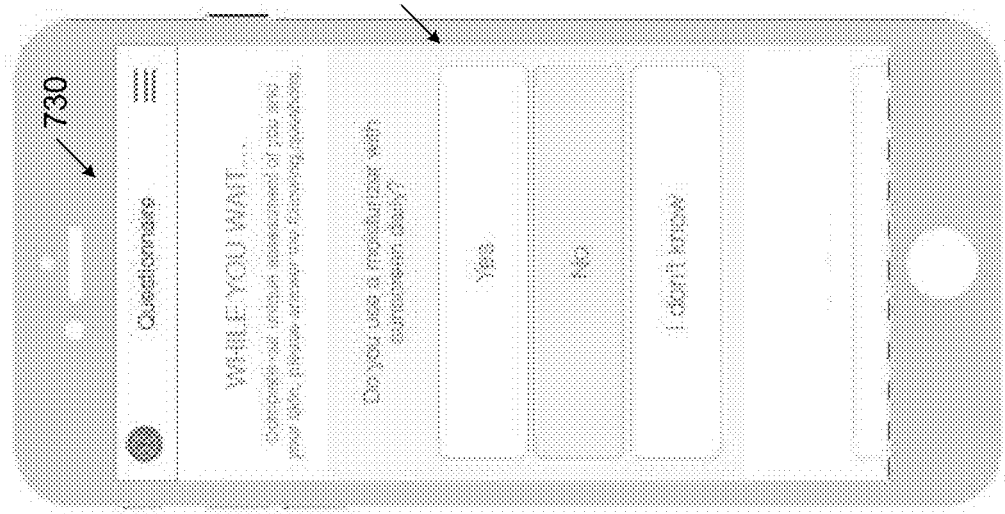
FIG. 7 depicts a user interface for providing a questionnaire to a user to customize product recommendations, according to embodiments described herein.

FIG. 7 depicts a user interface 730 for providing a questionnaire to a user to help customize product recommendations. In response to entering a real age in the age-input option 636 of FIG. 6, the user interface 730 may be provided. As illustrated, the user interface 730 may provide one or more questions for determining additional details regarding the user, including product preferences, current regimens, etc. As an example, the questions may include whether the user utilizes a moisturizer with sunscreen. One or more predefined answers 732 may be provided for the user to select from.

Figure 8:
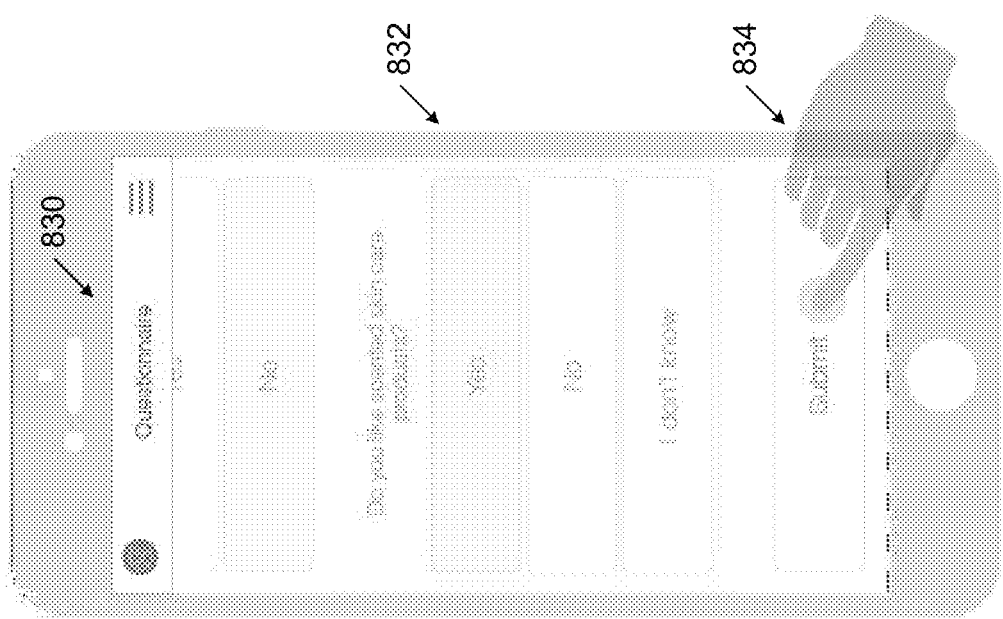
FIG. 8 depicts a user interface for providing additional prompts for a questionnaire, according to embodiments described herein.

FIG. 8 depicts a user interface 830 for providing additional prompts for a questionnaire, according to embodiments described herein. In response to entering the requested data from the user interface 730 of FIG. 7, the user interface 830 may be provided. As illustrated, the user interface 830 provides another question (such as whether the user prefers scented skin care products) along with three predefined answers 832 for the user to select from. A submit option 834 may also be provided for submitting the selected answer(s).

It should be understood that while FIGS. 7 and 8 provide two questions, any number of questions may be provided to the user, depending on the particular embodiment. The questions and number of questions may depend on the user's actual age, on the user's skin age, and/or other factors.

Figure 9:
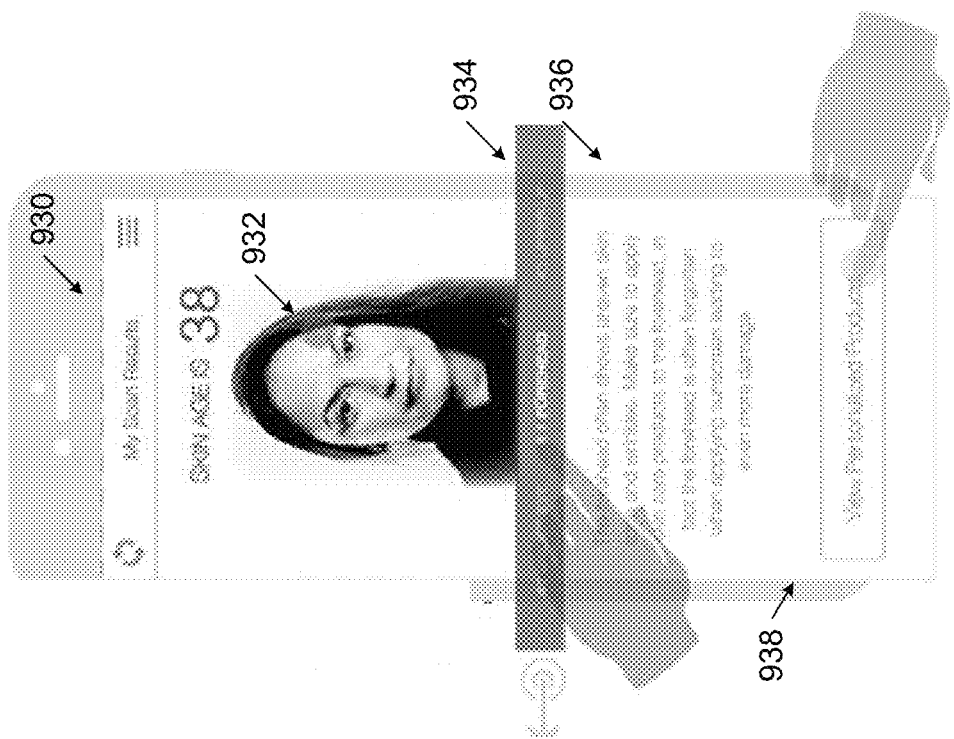
FIG. 9 depicts a user interface for providing a skin age of a user, based on a captured image, according to embodiments described herein.

FIG. 9 depicts a user interface 930 for providing a skin age of a user, based on a captured image, according to embodiments described herein. In response to completing the questionnaire of FIGS. 7 and 8, the user interface 930 may be provided. As illustrated, the user interface 930 may provide the user's skin age and the captured image with at least one identifier 932 to indicate which region(s) of the user's skin are contributing to the user age predicted by the CNN. In some instances, the system may also provide a list 934 of the areas that contribute to the user's predicted age. A description 936 may also be provided, as well as a product-recommendation option 938 for viewing customized product recommendations.

Figure 10:
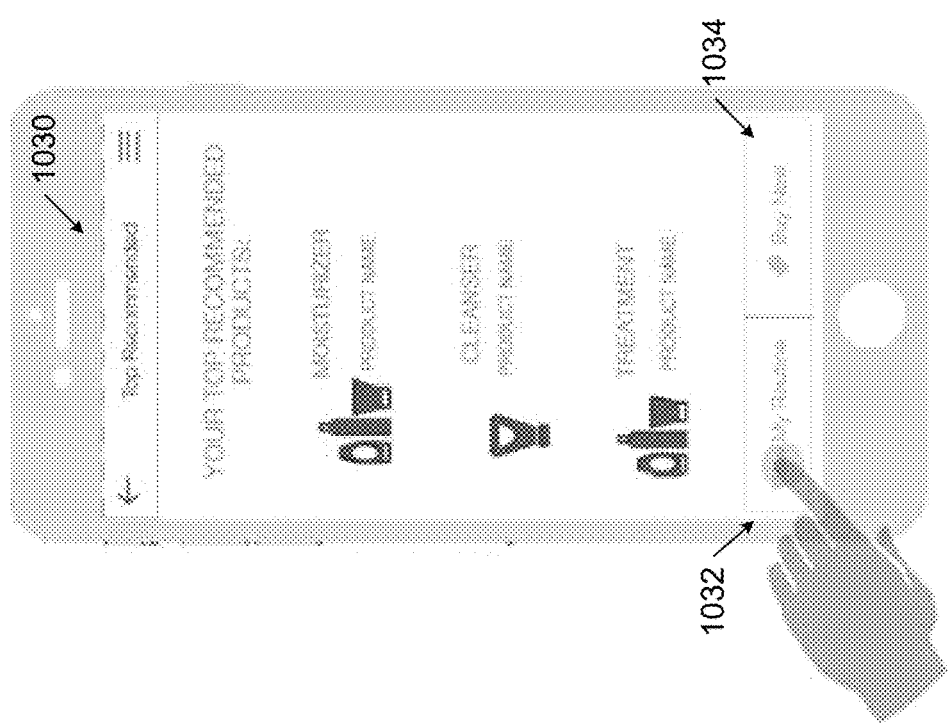
FIG. 10 depicts a user interface for providing product recommendations, according to embodiments described herein.

FIG. 10 depicts a user interface 1030 for providing product recommendations, according to embodiments described herein. In response to selection of the product-recommendation option 938 from FIG. 9, the user interface 1030 may be provided. As illustrated, the user interface 1030 may provide one or more recommended products that were determined based on the user's age, areas contributing to the user's age and the target age. Specifically, the at least one product may be determined as being applicable to the region of skin of the user that contributes to the predicted age of the user. As an example, creams, moisturizers, lotions, sunscreens, cleansers and the like may be recommended. Also provided is a regimen option 1032 for providing a recommended regimen. A purchase option 1034 may also be provided.

Figure 11:
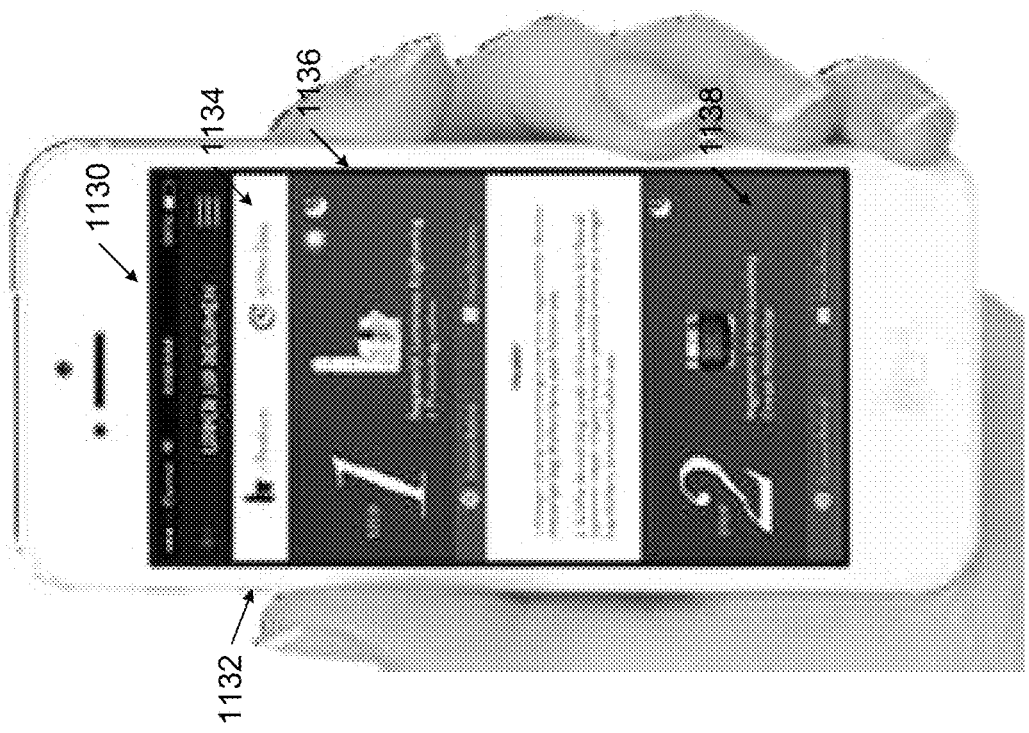
FIG. 11 depicts a user interface for providing details of product recommendations, according to embodiments described herein.

FIG. 11 depicts a user interface 1130 for providing details of product recommendations, according to embodiments described herein. In response to selection of the regimen option 1032 from FIG. 10, the user interface 1130 may be provided. As illustrated, the user interface 1130 may provide a products option 1132 and a schedule option 1134 for using the recommended product in the user's beauty regimen. Additional information related to the first stage of the beauty regimen may be provided in section 1136. Similarly, data related to a second and/or subsequent stage of the regimen may be provided in the section 1138.

Figure 12:
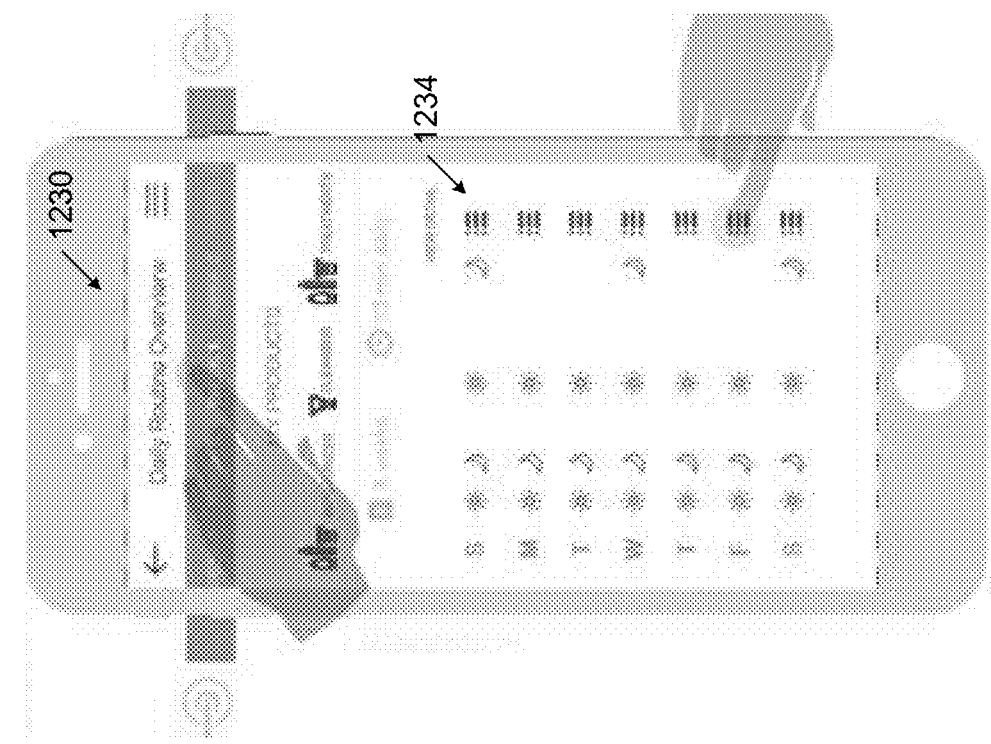
FIG. 12 depicts user interface that provides a regimen for applying products recommended for a user, according to embodiments described herein.

FIG. 12 depicts a user interface 1230 that provides a recommended beauty regimen. In response to selection of the schedule option 1134 from FIG. 11, the user interface 1230 may be provided. The user interface 1230 may provide a listing of recommended products, as well as a schedule, including schedule details for the regimen. Specifically, the user interface 1230 may provide a time of day that products may be provided. A details option 1234 may provide the user with additional details regarding products and the regimen.

Figure 13:
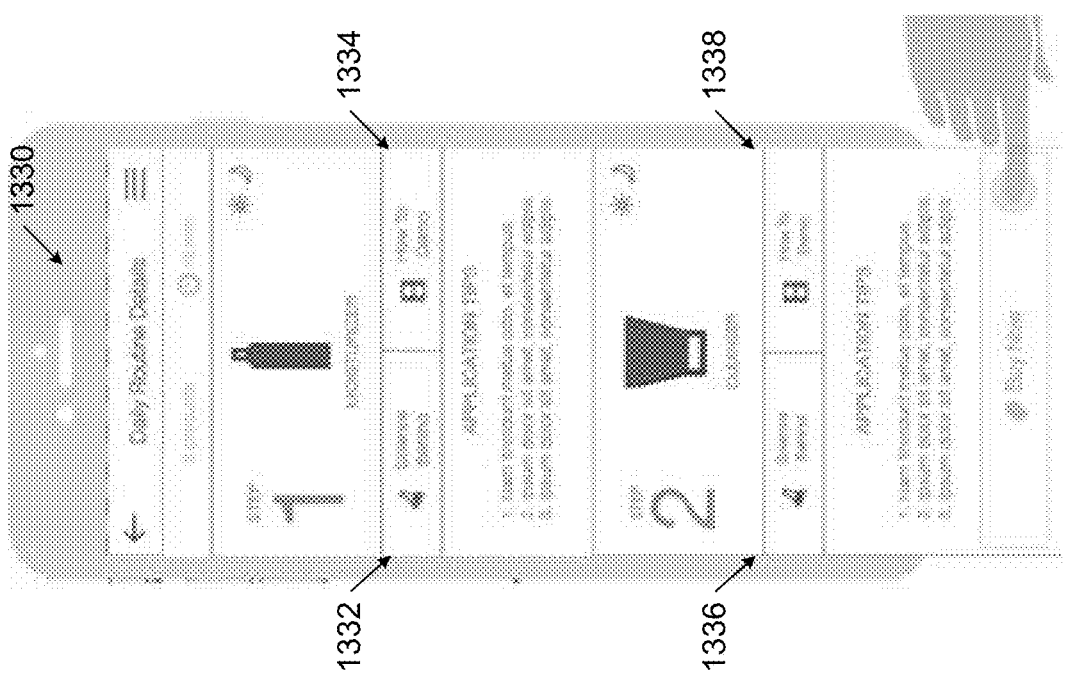
FIG. 13 depicts a user interface for providing details of a product regimen, according to embodiments described herein.

FIG. 13 depicts a user interface 1330 for providing additional details associated with a beauty regimen and the products used therein. The user interface 1330 may be provided in response to selection of the details option 1234 from FIG. 12. As illustrated, the user interface 1330 may provide details regarding products, application tips, etc. Additionally, a "science-behind" option 1332, 1336 and a "how-to-demo" option 1334, 1338 may be provided. In response to selection of the science behind option 1332, 1336, details regarding the recommended product and the application regimen may be provided. In response to selection of the how to demo option 1334, 1338, audio and/or video may be provided for instructing the user on a strategy for applying the product. Similarly, the subsequent portions of the regimen (such as step 2 depicted in FIG. 13) may also include a science behind option 1332, 1336 and a how to demo option 1334, 1338.

Figure 14:
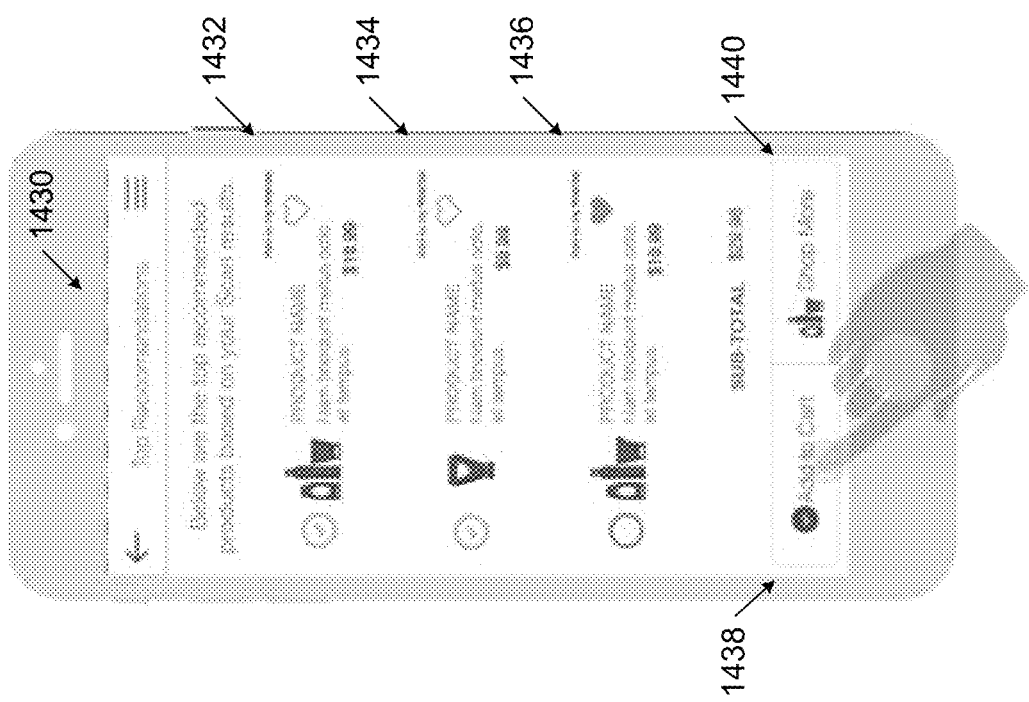
FIG. 14 depicts a user interface for providing recommendations related to a determined regimen, according to embodiments described herein.

FIG. 14 depicts a user interface 1430 for providing recommendations related to a determined regimen, according to embodiments described herein. In response to selection of the purchase option 1034 (FIG. 10), the user interface 1430 may be provided. As illustrated, the user interface 1430 includes purchasing options 1432, 1434, 1436 for purchasing one or more recommended products. The user interface 1430 may also provide an add-to-cart option 1438 and a shop-more option 1440.

Figure 15:
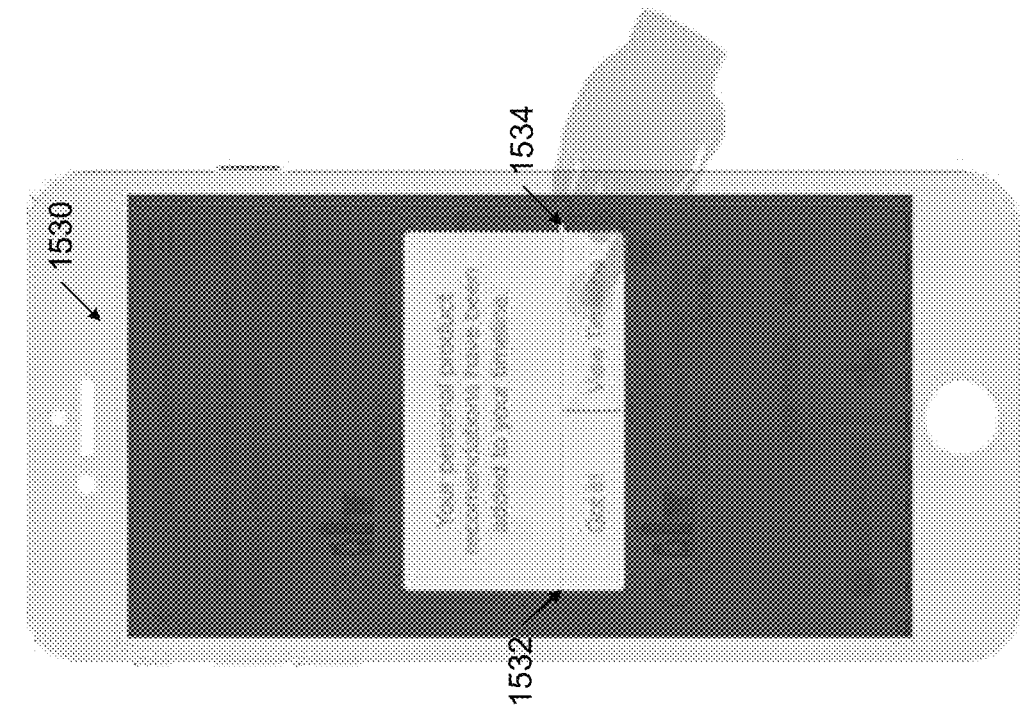
FIG. 15 depicts a user interface for providing product recommendations to a user timeline, according to embodiments described herein.

FIG. 15 depicts a user interface 1530 for providing product recommendations to a user timeline, according to embodiments described herein. As illustrated, the user interface 1530 may provide a notification that one or more of the recommended products have been added to the user's timeline. Upon purchasing a product (e.g., via the user interface 1430 from FIG. 14), the purchased products may be added to the recommended regimen for the user. As such, the notification may include an acceptance option 1532 and a view timeline option 1534.

Figure 16:
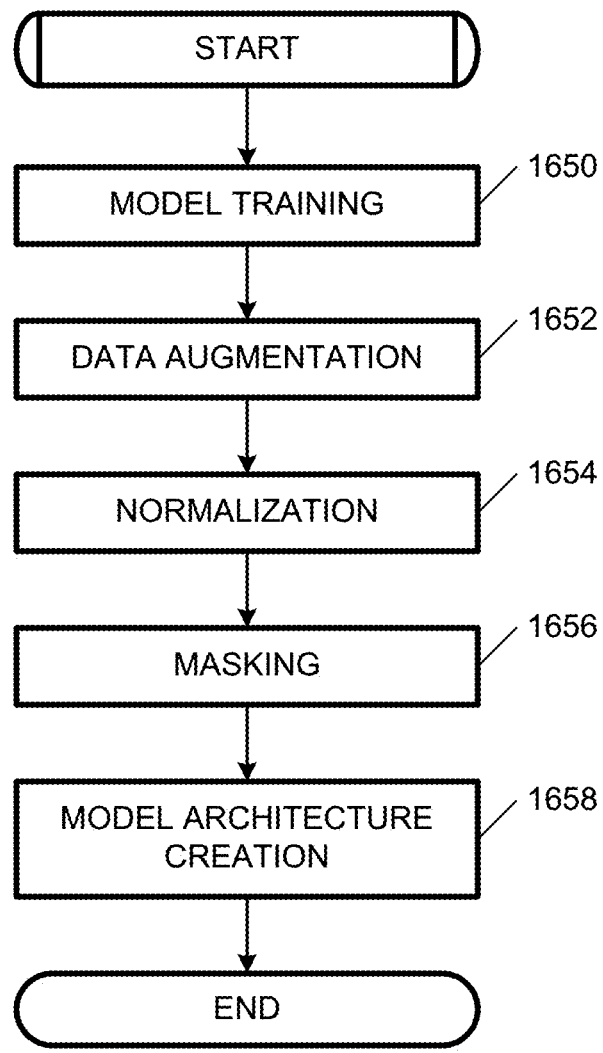
FIG. 16 depicts a flowchart for training a convolutional neural network for identifying a feature from an image, according to embodiments described herein.

FIG. 16 depicts a flowchart for training a convolutional neural network for identifying a feature from an image, according to embodiments described herein. As illustrated in block 1650, the CNN may be trained. As described above, the CNN may be trained utilizing training images and a convolutional neural network. In block 1652, data augmentation may be performed. Specifically, to increase the robustness of the CNN, data augmentation techniques may be utilized to create additional samples from the training images. As described above, some embodiments may be configured to randomly zoom in and zoom out of the image; perform a random rotation of the image in a clockwise direction and/or in a counter clockwise direction;

randomly crop the image; randomly change the saturation and exposure of the input image; utilize vertical dropout to randomly dropout a column of pixels (feature map) of an image; etc. In block 1654, one or more of the training images may be normalized. Normalization may include cropping, rotation, zooming, removal of background imagery, etc. In block 1656, masking may be performed. Masking may include identifying areas of interest to determine skin age, as well as creating a heat map for representing the areas of interest. In block 1658, the CNN architecture may be created via the convolutional neural network.

Figure 17:
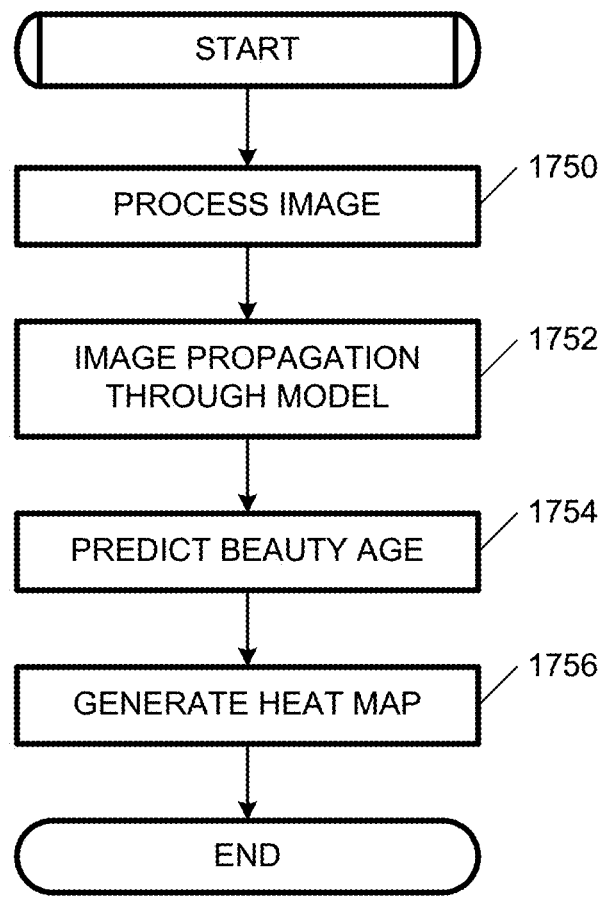
FIG. 17 depicts a flowchart for generating a heat map of an image, which may be utilized for feature recognition, according to embodiments described herein.

FIG. 17 depicts a flowchart for generating a heat map of an image, which may be utilized for feature recognition, according to embodiments described herein. As illustrated in block 1750, an image may be processed. As described above, an image may be processed, such as by cropping, rotating, zooming, etc. In block 1752, the image may be propagated through the CNN. As described above, the image may be processed through the convolutional neural network to identify pixels, regions, and/or areas that signify a skin age. In block 1754, the skin age may be predicted. In block 1756, a heat map may be generated.

Figure 18:
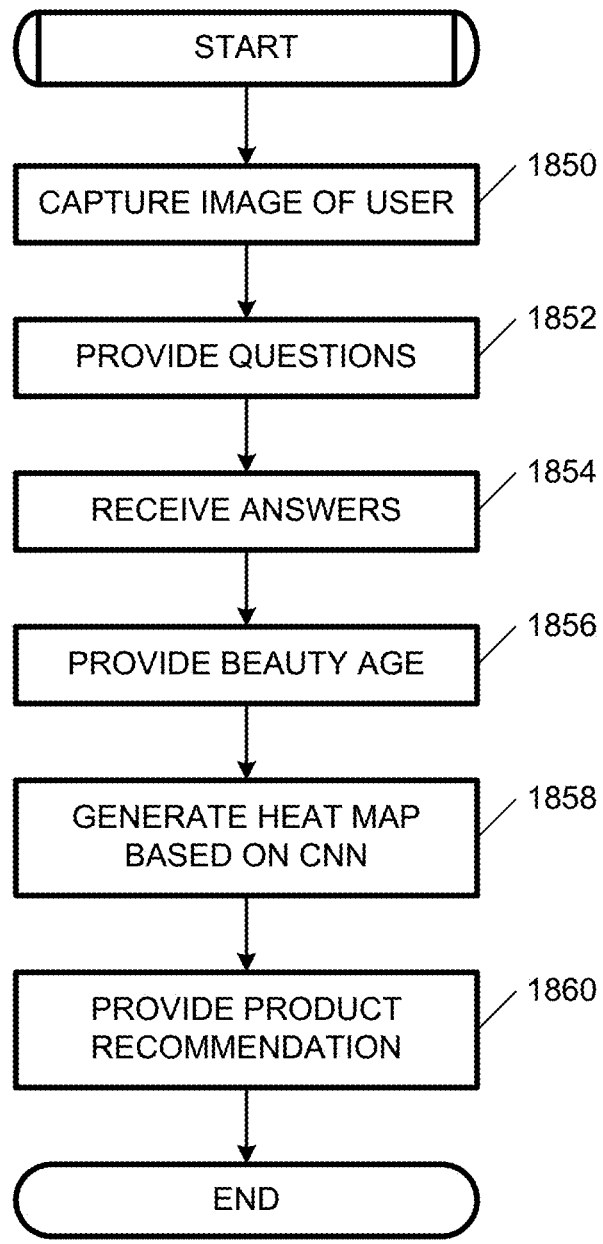
FIG. 18 depicts a flowchart for providing customized product recommendations, according to embodiments described herein.

FIG. 18 depicts a flowchart for providing customized product recommendations, according to embodiments described herein. In block 1850, an image of a user may be captured. In block 1852, questions may be provided to the user. In block 1854, answers to the questions may be received from the user. In block 1856, a skin age may be provided to the user. In block 1858, a heat map may be generated based on a convolutional neural network. In block 1860, a customized product recommendation may be provided to the user.

Figure 19:
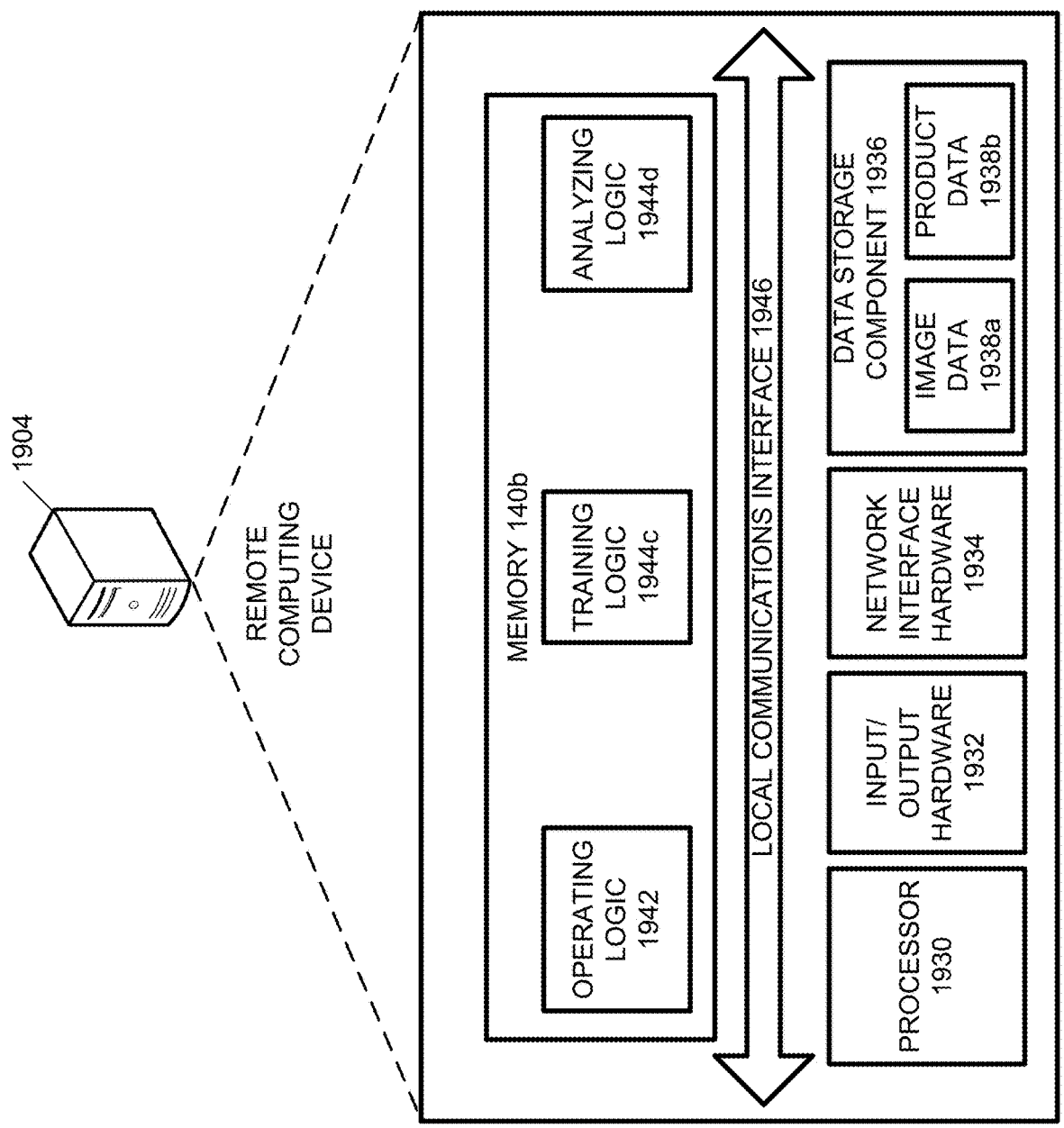
FIG. 19 depicts components of a remote computing device for providing customized product recommendations, according to embodiments described herein.

FIG. 19 depicts components of a remote computing device 1904 for providing customized product recommendations, according to embodiments described herein. The remote computing device 1904 includes a processor 1930, input/output hardware 1932, network interface hardware 1934, a data storage component 1936 (which stores image data 1938*a*, product data 1938*b*, and/or other data), and the memory component 1940*b*. The memory component 1940*b* may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the remote computing device 1904 and/or external to the remote computing device 1904.

The memory component 1940*b* may store operating logic 1942, the training logic 1944*c* and the analyzing logic 1944*d*. The training logic 1944*c* and the analyzing logic 1944*d* may each include a plurality of different pieces of logic, each of which may be embodied as a computer program, firmware, and/or hardware, as an example. A local communications interface 1946 is also included in FIG. 19 and may be implemented as a bus or other communication interface to facilitate communication among the components of the remote computing device 1904.

The processor 1930 may include any processing component operable to receive and execute instructions (such as from a data storage component 1936 and/or the memory component 1940*b*). As described above, the input/output hardware 1932 may include and/or be configured to interface with the components of FIG. 19.

The network interface hardware 1934 may include and/or be configured for communicating with any wired or wireless networking hardware, including an antenna, a modem, a LAN port, wireless fidelity (Wi-Fi) card, WiMax card, Bluetooth™ module, mobile communications hardware, and/or other hardware for communicating with other networks and/or devices. From this connection, communication may be facilitated between the remote computing device 1904 and other computing devices, such as those depicted in FIG. 1.

The operating system logic 1942 may include an operating system and/or other software for managing components of the remote computing device 1904. As discussed above, the training logic 1944*c* may reside in the memory component 1940*b* and may be configured to cause the processor 1930 to train the convolutional neural network. Similarly, the analyzing logic 1944*d* may be utilized to analyze images for skin age prediction.

It should be understood that while the components in FIG. 19 are illustrated as residing within the remote computing device 1904, this is merely an example. In some embodiments, one or more of the components may reside external to the remote computing device 1904 and/or the remote computing device 1904 may be configured as a mobile device. It should also be understood that, while the remote computing device 1904 is illustrated as a single device, this is also merely an example. In some embodiments, the training logic 1944*c* and the analyzing logic 1944*d* may reside on different computing devices. As an example, one or more of the functionalities and/or components described herein may be provided by the mobile computing device 102 and/or other devices, which may be communicatively coupled to the remote computing device 104. These computing devices may also include hardware and/or software for performing the functionality described herein.

Additionally, while the remote computing device 1904 is illustrated with the training logic 1944c and the analyzing logic 1944d as separate logical components, this is also an example. In some embodiments, a single piece of logic may cause the remote computing device 1904 to provide the described functionality.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A system for providing customized product recommendations to a user, comprising:
    a) an image capture device;
    b) an image of a user captured by the image capture device; and
    c) a computing device coupled to the image capture device, wherein the computing device includes a memory component that stores logic that causes the system to
        (i) analyze the captured image of the user using a convolutional neural network to predict a user's age, wherein predicting the user's age includes identifying a portion of skin in the captured image that contributes to the predicted age of the user,
        (ii) utilize at least one pixel from the portion of skin identified in the captured image to generate a heat map that identifies a region of the image that contributes to the user's predicted age,
        (iii) display the heat map to the user on a display device visible to the user, and
        (iv) recommend a product for the user to apply to a region of skin for achieving a target skin age.

2. The system of claim 1, wherein generating the heat map comprises overlaying a first layer and a second layer on at least a portion of the image of the user, the first layer comprising a mask of interest that divides the image into a plurality of regions and the second layer comprising a pixel map that identifies a region in the mask of interest that contributes to the predicted age of the user.

3. The system of claim 1, wherein the logic causes the heat map to be displayed to the user.

4. The system of claim 1, wherein the logic further causes the system to preprocess the image, wherein preprocessing comprises: determining an anchor feature on the image and altering the image to place the anchor feature in a predetermined position.

5. The system of claim 1, wherein the logic further causes the system to train the convolutional neural network utilizing a training image.

6. The system of claim 5, wherein training the convolutional neural network includes data augmentation that is utilized to create additional samples from the training image, wherein the data augmentation includes at least one of the following: randomly zoom in on the training image, zoom out of the training image, perform a random rotation of the image in a clockwise direction, perform a random rotation of the image and in a counter clockwise direction, randomly crop the image, randomly change saturation of the image, randomly change exposure of the training image, and utilize vertical dropout to randomly dropout a column of pixels of the training image.

7. The system of claim 1, wherein the logic further causes the system to provide a questionnaire that includes a question for the user to provide an answer, wherein the answer is utilized for determining the product.

8. The system of claim 1, wherein the logic further causes the system to determine a regimen for the user to apply the product to the region of skin to achieve a target skin age.

9. The system of claim 1, wherein the heat map includes at least one scaled pixel that indicates a level to which the scaled pixel contributes to the user's predicted age.

10. The system of claim 1, wherein the logic further causes the system to provide an option for the user to purchase the product.

11. A method of providing a customized product recommendation to a consumer, comprising:
    a) capturing an image of a user with an image capture device;
    b) analyzing the image with a computing device coupled to the image capture device, wherein the computing device analyzes the image using a convolutional neural network to predict the user's age, and wherein predicting the user's age includes identifying a portion of skin in the captured image that contributes to the predicted age of the user;
    c) utilizing at least one pixel from the portion of skin in the captured image to generate a two-dimensional heat map that identifies a region of skin in the image that contributes to the predicted age of the user;
    d) recommending a product for the user to apply to the region of skin for achieving a target skin age; and
    e) providing an option for the user to purchase the product.

12. The method of claim 11, wherein the heat map is displayed to the user on display device visible to the user.

13. The method of claim 11, wherein generating the heat map comprises overlaying a first layer and a second layer on at least a portion of the image of the user, the first layer comprising a mask of interest that divides the image into a plurality of regions and the second layer comprising a pixel map that identifies a region in the mask of interest that contributes to the predicted age of the user.

14. The method of claim 11, further comprising preprocessing the image, wherein preprocessing comprises: determining an anchor feature on the image and altering the image to place the anchor feature in a predetermined position.

15. The method of claim 11, further comprising training the convolutional neural network utilizing a training image.

16. The method of claim 11, further comprising providing a questionnaire that includes a question for the user to provide an answer, wherein the answer is utilized for determining the product.

17. The method of claim 11, further comprising determining a regimen for the user to apply the product to the region of skin to achieve the target skin age.

18. The method of claim 11, wherein the target skin age is less than the predicted age of the consumer.

19. The method of claim 11, wherein the heat map includes at least one scaled pixel that indicates a level to which the at least one pixel contributes to the skin age.

* * * * *